(12) United States Patent
Odegard

(10) Patent No.: US 10,839,468 B2
(45) Date of Patent: Nov. 17, 2020

(54) GRAPHICAL PLATFORM FOR INTERACTING WITH UNSTRUCTURED DATA

(71) Applicant: Navigatorsvrs, Inc., Seattle, WA (US)

(72) Inventor: Taylor Hanson Odegard, Sammamish, WA (US)

(73) Assignee: Navigatorsrvs, Inc., Seattle, WA (US)

(*) Notice: Subject to any disclaimer, the term of this patent is extended or adjusted under 35 U.S.C. 154(b) by 0 days.

(21) Appl. No.: 16/369,677

(22) Filed: Mar. 29, 2019

(65) Prior Publication Data

US 2019/0295197 A1   Sep. 26, 2019

Related U.S. Application Data

(63) Continuation of application No. 15/439,749, filed on Feb. 22, 2017, now Pat. No. 10,290,068.

(Continued)

(51) Int. Cl.
*G06F 3/048* (2013.01)
*G06Q 50/16* (2012.01)
(Continued)

(52) U.S. Cl.
CPC ............ *G06Q 50/16* (2013.01); *G06F 16/23* (2019.01); *G06F 16/282* (2019.01);
(Continued)

(58) Field of Classification Search
CPC ............ G06Q 50/16; G06F 17/30345; G06F 17/30589; G06F 17/30693; G06F 21/6227; G06F 21/6236; G06F 2221/2111
(Continued)

(56) References Cited

U.S. PATENT DOCUMENTS 8,028,225 B2 * 9/2011 Zare ................. G06F 16/26
                                                    715/200
8,504,073 B2 * 8/2013 Svendsen ........... G06Q 30/0261
                                                    455/456.3
(Continued)

FOREIGN PATENT DOCUMENTS

KR         101159378 A      7/2012
KR         101224664 A      1/2013

OTHER PUBLICATIONS

PCT Search Report and Written Opinion dated May 31, 2017 for PCT Application No. PCT/US17/19169, 15 pages.

*Primary Examiner* — David Phantana-angkool
(74) *Attorney, Agent, or Firm* — Lee & Hayes, P.C.

(57) ABSTRACT

A graphical platform enables users to leverage unstructured data in many different ways via access with many different types of devices that can be located practically anywhere with network connectivity. The graphical platform provides users with flexibility in how they create, maintain, and access the unstructured data, while providing powerful tools to enable the users to quickly extract meaningful information from the unstructured data. The graphical platform leverages location information in the unstructured data to enable providing a map and/or other graphical interfaces that show at least some of the records in the unstructured data. Users can then filter the information to narrow down the records to those of interest to respective different users. From the resulting display of records, users can select a specific record, access additional secure documents associated with the record, and/or perform other interactions with the data in the record.

20 Claims, 17 Drawing Sheets

Related U.S. Application Data

(60) Provisional application No. 62/300,648, filed on Feb. 26, 2016.

(51) Int. Cl.
*G06F 21/62* (2013.01)
*G06F 16/23* (2019.01)
*G06F 16/28* (2019.01)
*G06F 16/33* (2019.01)

(52) U.S. Cl.
CPC ...... *G06F 16/3349* (2019.01); *G06F 21/6227* (2013.01); *G06F 21/6236* (2013.01); *G06F 2221/2111* (2013.01)

(58) Field of Classification Search
USPC ........................................................ 715/738
See application file for complete search history.

(56) References Cited

U.S. PATENT DOCUMENTS

| | | |
|---|---|---|
| 8,510,031 B2 | 8/2013 | Williams et al. |
| 8,799,799 B1 * | 8/2014 | Cervelli ............ G06T 11/60 715/765 |
| 8,938,686 B1 * | 1/2015 | Erenrich ........ G06Q 10/06395 715/771 |
| 8,954,514 B2 | 2/2015 | Gunasekara |
| 9,009,610 B2 | 4/2015 | Florance et al. |
| 9,104,695 B1 * | 8/2015 | Cervelli ............ G06F 16/29 |
| 9,129,219 B1 * | 9/2015 | Robertson ............ G06N 5/048 |
| 9,152,946 B2 | 10/2015 | Rankin, Jr. et al. |
| 9,436,945 B2 | 9/2016 | Eraker et al. |
| 9,607,092 B2 | 3/2017 | Kreitler et al. |
| 9,760,237 B2 | 9/2017 | Eraker et al. |
| 9,760,840 B1 * | 9/2017 | Tyagi ............ G06Q 10/06313 |
| 10,101,880 B2 * | 10/2018 | Sellam ............ G06F 40/18 |
| 10,147,150 B1 | 12/2018 | Carrington |
| 10,270,727 B2 * | 4/2019 | Philipson ............ G01C 21/362 |
| 10,290,068 B2 * | 5/2019 | Odegard ............ G06Q 50/16 |
| 10,467,435 B1 * | 11/2019 | Ding ............ G06F 21/53 |
| 10,515,433 B1 * | 12/2019 | Wilczynski ........ G06F 3/04845 |
| 10,579,239 B1 * | 3/2020 | Wilczynski ........ H04L 63/105 |
| 2008/0208652 A1 * | 8/2008 | Srivastava ....... G06Q 10/06375 705/7.34 |
| 2008/0312942 A1 | 12/2008 | Katta et al. |
| 2009/0158185 A1 * | 6/2009 | Lacevic ............ G09B 29/005 715/768 |
| 2011/0288962 A1 * | 11/2011 | Rankin, Jr. ............ G06Q 30/02 705/27.1 |
| 2012/0030563 A1 | 2/2012 | Lemonik et al. |
| 2012/0124069 A1 * | 5/2012 | Zachar ............ G06F 16/248 707/758 |
| 2012/0254156 A1 * | 10/2012 | Rao ............ G06Q 50/16 707/722 |
| 2014/0223284 A1 * | 8/2014 | Rankin, Jr. ............ G06F 40/186 715/234 |
| 2017/0249711 A1 | 8/2017 | Odegard |

\* cited by examiner

US 10,839,468 B2

GRAPHICAL PLATFORM FOR INTERACTING WITH UNSTRUCTURED DATA

CROSS-REFERENCE TO RELATED APPLICATION

This application is a continuation of U.S. patent application Ser. No. 15/439,749, filed Feb. 22, 2017, entitled "GRAPHICAL PLATFORM FOR INTERACTING WITH UNSTRUCTURED DATA," and now known as U.S. Pat. No. 10,290,068, which claims priority to U.S. Provisional Patent Application No. 62/300,648, filed Feb. 26, 2016, and entitled "GRAPHICAL PLATFORM FOR INTERACTING WITH UNSTRUCTURED DATA," both of which are herein incorporated by reference in their entirety.

BACKGROUND

Many companies continue to maintain data in static data repositories, such as spreadsheets or other data repositories, which are often not configured to enable sharing and updating by many of the users. Instead, the repositories are updated periodically by a central source (e.g., management users, etc.) and then distributed to the users that rely on the data. This process results in a delay of information to the users, but is often justified as allegedly securing proprietary information while controlling access and modification to the repositories.

Many users access data using mobile devices, such as mobile telephones (or smartphones), laptop computers, and tablet computers. These tools enable access to data by users located in various different locations. However, these devices are not optimized to generate ad hoc reporting using static data repositories, such as spreadsheets. Sifting through large data sets using mobile devices can be time consuming and frustrating especially when the data is only visible in a table format.

In many instances, these existing data repositories can be leveraged to better communicate information to users in a convenient way without compromising security and control of modifications. For example, in the real estate industry, many different users, such as property owners, agents, vendors, and other interested parties, may desire to access similar information. In addition, the users may want to see different reports and/or perform different analytics using the same underlying data based on their own needs, desires, or goals.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
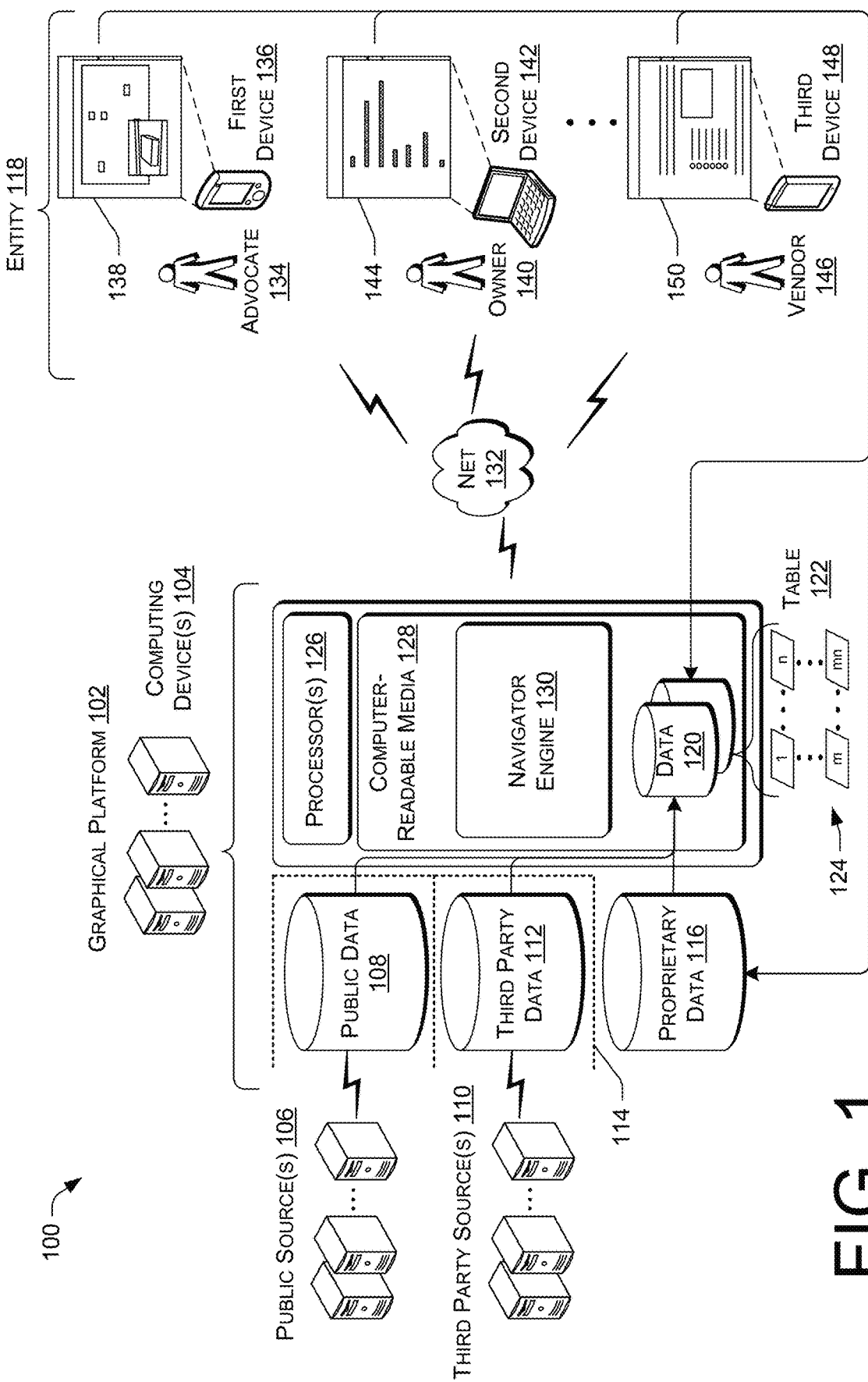
FIG. 1 is a schematic diagram of an illustrative computing environment supporting a graphical platform for interacting with unstructured data.

This disclosure is directed a graphical platform that enables users to leverage unstructured data in many different ways via access with many different types of devices that can be located practically anywhere with network connectivity. The graphical platform provides users with flexibility in how they create, maintain, and access the unstructured data, while providing powerful tools to enable the users to quickly extract meaningful information from the unstructured data. The graphical platform leverages location information in the unstructured data to enable providing a map and/or other graphical interfaces that show at least some of the records in the unstructured data. Users can then filter the information to narrow down the records to those of interest to respective different users. From the resulting display of records, users can select a specific record, access additional secure documents associated with the record, and/or perform other interactions with the data in the record.

The users may be a diverse set of people with different roles and different interactions with the unstructured data. For example, the users may include owners of assets, agents that assist in buying and selling of assets, vendors that provide goods and services associated to the services, and possibly other interested parties. Each user may have corresponding access rights and privileges to view certain fields of information in the unstructured data, while possibly being prevented from viewing some data that is restricted for other users. As discussed below, non-registered users may also gain limited access to some of the unstructured data in some instances, such as when some data is shared during a transaction or other offering, possibly via a shared report of "snapshot".

The unstructured data may be joined with a number of core fields used to associate the data with graphical features (e.g., mapping, reporting, etc.) while maintaining unique records to avoid data duplication and maintain data conformity. As discussed herein, unstructured data is data that includes names and data types determined by an entity using the graphical platform, and not by predetermined names and data types that are often hardcoded into other platforms. Thus, an entity may import its proprietary information from a spreadsheet while maintaining many, if not all, of the field names and data types used in the spreadsheet when the data is used in the graphical platform. This allows the users to instantly understand the data accessed in the graphical platform without have to learn new terminology. The core fields may include fields like "address", "city", "state," "zip code", and so forth, which often align with naming conventions used by entities. Unstructured data may be added to the core fields and to additional fields, which may have few or no naming or datatype restrictions imposed by the platform. The unstructured data may include proprietary data provided by or produced by an entity that uses the graphical platform. Some unstructured data may include data from third party suppliers, such as parties that offer data aggregation as a service. Some unstructured data may include public or free data, such as data available via the internet or other shared or public resources, possibly including data generated via open sources software.

The graphical platform may enable users to quickly filter the data to identify records of interest. In some embodiments, filters may be automatically created to support filtering fields of the unstructured data. The platform may also enable users to create filters, such as when filters do not yet exist for some unstructured fields or for other reasons. The results of the filtering may limit results shown across different interfaces of the graphical platform, such as results on a map view, results on a record view (e.g., card), results on a table view, results on a report view, and/or other results. The filters may be used multiple times to enable a user to continually reduce a number of records shown or adjust the filter criteria, thereby modifying the results shown across the graphical platform.

In various embodiments, the graphical platform may enable sharing of reports and analytics generated by users. For example, a user may generate a report by filtering data, adding one or more graphics, and adding other information. The report may access data in the underlying table, and thus may automatically update as the underlying data in the table is updated. For example, as new records are added to the table, the report may show different results. As another example, if the report has a temporal aspect, the data displayed in the report may change depending on the time of access of the report even if the underlying data in the table is relatively unchanged or static. For example, the unstructured data may include dates, such as dates corresponding to lease terms, build dates, permit dates, and/or other temporal information.

The reports and analytics may be shared with registered users of the graphical platform, possibly through a library and/or a messaging interface. The reports and analytics may also be shared with non-registered users via a snapshot tool that creates a snapshot of the underlying data used to support the report, which may be loosely analogous to recording a user's session. The non-registered user may be given limited access to view the report and interact with the underlying data using the graphical platform, possibly subject to some restrictions of use or restrictions of accessing other data or tools via the platform. As an example in the context of commercial real estate, a first user may select a number of properties to offer to a second user. Using the graphical platform, the first user may create a filter that includes the properties, or may selected the properties using other tools (e.g., selectors). The first user may also add documents for a transaction, which may be associated, by the graphical platform, with records corresponding to the properties. The first user may then provide the second user with access to the properties via the graphical platform. The second user may interact with the second properties via the graphical platform to extract information from the records, view images of the properties, view reports and other data about the properties, and access the documents corresponding to the properties, and possibly even modify and/or sign documents. This may enable the first user and second user to quickly and easily facilitate a transaction using real time data in the tables without the delay involved in traditional transactions, which are often delayed due to mailing of documents, travel by a user to a location, or for other reasons.

The graphical platform disclosed herein leverages the graphical and temporal nature of data, while enabling crowdsourcing of updates and information from its registered user-base in a secure manner. Although many examples provided herein discuss use of properties and real estate, the platform is not limited to those fields or data types. Instead, the platform can be used to facilitate better interaction and immersion in any unstructured data that can be shown graphically without simply viewing the data in a table. The techniques and systems described herein may be implemented in a number of ways. Example implementations are provided below with reference to the following figures.

FIG. 1 is a schematic diagram of an illustrative computing environment 100 supporting a graphical platform for interacting with unstructured data. The environment 100 may include a graphical platform 102 (or "platform") that is hosted by one or more computing device(s) 104. As discussed below, the computing devices 104 may be cloud computing devices that operate in a distributed arrangement.

The platform 102 may receive data from various sources including public sources 106 that supply public data 108 and/or third party sources 110 that supply third party data 112. The public data 108 may include data generated from open source software, such as mapping data, data from public records, crowdsourced data, images, and/or other data available via the internet or other publicly available data repositories. The public data 108 may be selectively captured for use by the platform 102, and thus may the contents of the public data 108 may be managed by the platform 102.

The third party data 112 may include data provided via a subscription, such as a data provide as a service for a fee, or possibly provided via other arrangements. The third party data 112 may be regularly updated by the third party sources 110, which may include continual, periodic, or random updates. The third party data 112 may be proprietary data supplied to the platform 102 under license agreements or other conditions. The public data 108 and the third party data 112 may be isolated from other protected data associated with the platform 102, such as by a firewall 114, to prevent the third party sources 110 and/or other users from accessing other data in the platform 102.

The platform 102 may also include proprietary data 116, which may be created, maintained, and used by an entity 118 supported by the platform 102. The entity 118 may include many different users, some possibly having different roles such as advocate, owner, and vendor, among other possible roles. The platform 102 may support other entities using similar environments, which may or may not share components from other entities. Thus, other similar platforms may be implemented for use by other entities. Each platform 102 may be customized by the entity that uses it.

The platform 102 includes data 120, which may include a table 122 along with other data, described below. The table 122 includes table data 124 that may be from one or more of the public data 108, the third party data 112, and/or the proprietary data 116. The table 122 may be a flat table (i.e., two dimensional table) that merges some or all of the data from the proprietary data 116 with some or all data from the third party data 112 and/or some or all data from the public data 108. In some embodiments, the table data 124 may include large amounts of unstructured data. As discussed above, unstructured data may be data that includes names and datatypes determined by the entity 118 using the platform 102, and not by predetermined names and datatypes that are often hardcoded into other platforms. Thus, the entity 118 may import its proprietary information from a spreadsheet (or other data repository) while maintaining many, if not all, of the field names and data types used in the spreadsheet (or other data repository) when the data is used in the platform 102. This allows the users to instantly understand the data accessed in the platform 102 without have to learn new terminology. The table 122 may include some core fields that may include fields like "address", "city", "state," "zip code", and so forth, which often align with naming conventions used by entities. Unstructured data may be added to the core fields and to additional fields, which may have few or no naming or datatype restrictions imposed by the platform 102. The contents of the data 120 is further described with reference to FIG. 2 below.

The platform 102 may include processors 126 and computer-readable memory 128, which may store a navigator engine 130 that enables the users to interact with data in the table 122 and/or other data using one or more graphical interfaces. The navigator engine 130 may locate records of the table data 124, or a portion thereof, on a map, in cards, in a table view, in reports, in snapshots, and/or in other outputs to facilitate user interaction. The various modules of the navigator engine 130 are described in detail with reference to FIG. 2 below.

The platform 102 may be accessible via users of the entity 118 via one or more networks 132, including wireless networks that enable secure access to the table data 124. The users may include advocates, owners, vendors, and/or other types of users depending on the type of data stored in the table data 124 and/or the scope of operation of the entity 118. For example, when the entity 118 is involved in commercial real estate, the users may include advocates, owners, and vendors; however, other entities may not have the same types of users. Different users may have different access privileges and/or ability to modify data in the table data 124.

The entity 118 may include an advocate 134 having a first device 136, such as a mobile telephone (or virtually any other network data input device). The advocate 134 may be a salesperson, a broker, an agent, a consultant, and/or may have another role with the entity and provide services using the table data. The advocate 134 may access some or all of the table data 124 via the first device 136, which may enable the advocate 134 to view real time information in almost any location via a first user interface 138. For example, when the table 122 includes commercial real estate information, the advocate may be able to access current lease information for a building that is included in the table data 124, as well as other associated information about the building that is stored in the data 120, such as images, documents, and/or other data. The advocate 134, for example, may create reports/analytics, filter data, and/or create snapshots of data in the table data during interaction with the platform 102.

The entity 118 may include an owner 140 that owns or manages one or more items included in the table 122. For example, the owners may own properties and/or buildings included in the table 122 when the table include real estate data. The owner 140 may access at least some of the table data 124 via a second device 142, such as a mobile or desktop computer (or virtually any other network data input device). The owner 140 may interact with the table data 124 via a second user interface 144, which may be the same as the first user interface 138 or at least slightly different than the first user interface 138 (possibly having different reports, tabs, or other features). The owner 140, for example, may update information about her properties or items represented in the table data 124. In some embodiments, the access privileges of the owners may be different than access privileges of the advocates.

The entity 118 may include a vendor 146 (e.g., supplier or other third party) that provides services associated with the table data 124 in the table 122. In the context of commercial real estate, the vendors may include lenders, title companies, appraisers, contractors, architects, engineers, building systems providers, building material providers, accountants and lawyers, for example. The vendor 146 may access at least some of the table data 124 via a third device 148, such as a tablet computer (or virtually any other network data input device). The vendor 146 may interact with the table data 124 via a third user interface 144, which may be the same as the first user interface 138 and/or the second user interface 144 or at least slightly different than the first user interface 138 or the second user interface 144 (possibly having different reports, tabs, or other features). The vendor 146, for example, may access reports via the platform 102. In some embodiments, the access privileges of the vendors may be different than access privileges of the owners and/or advocates.

As shown in FIG. 1, the various uses of the platform 102 may include updating the proprietary data 116, subject to privileges. For example, first user may access the table data 124 via a mobile device and add notes, images, and/or documents associated with a record of data, which may update the proprietary data 116 and/or the data 120. The first user may generate reports/analytics and/or snapshots that may be stored in the data 120 and may be made available for use by other users, possibly subject to some restrictions. A second user may add additional data to the proprietary data 116, such as additional fields of data, new records, and/or other data, which may update the data 120, and may be available to users of the platform 102 as soon as the data 120 is updated. The data 120 may be updated regularly to reflect changes in the proprietary data 116, as well as updates to the third party data 112 and/or the public data 108. Thus, users may view real time or near-real time updates to the data in the table 122 which may reflect recent updates to the proprietary data 116, as well as updates to the third party data 112 and/or the public data 108.

The first device 136, the second device 142, and/or the third device 148 may accesses the data 120 in response to information input by a user and/or device data transmitted by one of these devices. The device data may include, among other things, global positioning system (GPS) data, image data, user profile data, and/or other data generated by the device or stored on the device. In some embodiments, a user with a device may be located near a building. The device may transmit a GPS location of the device to the graphical platform 102. The graphical platform 102 may then serve at least some of the data 120 to the device based on the GPS location. For example, the graphical platform 102 may provide portions of the data 120 pertaining to a property near the device or proximate to the device. In this way, a user may readily access property data with minimal or no user inputs. Instead, the property data may be available as a user moves about properties with the device. In some embodiments, the user may access a virtual tour of a nearby property/building or property/building proximate the user and device when the data 120 includes virtual tour data, such as images, videos, and/or other rendering data. The data may also include many types of real estate data, such as property specifications, financial history, and/or other textual data.

Figure 2:
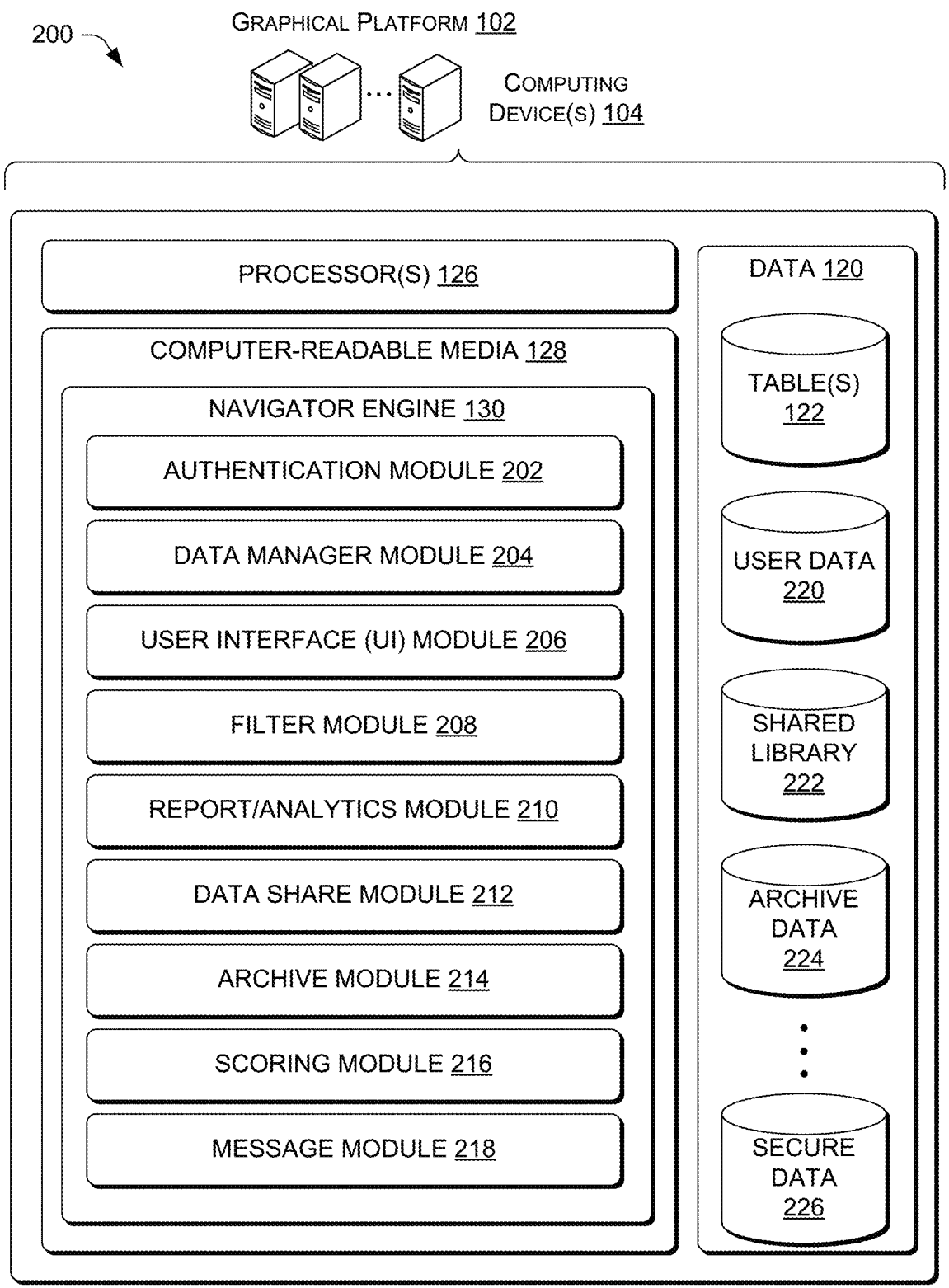
FIG. 2 is a schematic diagram of illustrative computing architecture of the graphical platform for interacting with unstructured data.

FIG. 2 is a schematic diagram of illustrative computing architecture 200 of the graphical platform for interacting with unstructured data. The computing architecture 200 may be implemented in a distributed or non-distributed computing environment. For example, the computing architecture may be implemented using cloud computing services, such as virtual machines in a distributed environment.

The computing architecture 200 may include the one or more processors 126 and the one or more computer readable media 128 that stores various modules, applications, programs, or other data. The computer-readable media 128 may include instructions that, when executed by the one or more processors 126, cause the processors 126 to perform the operations described herein for the platform 102.

Embodiments may be provided as a computer program including a non-transitory machine-readable storage medium having instructions that may be used to program a computer (or other electronic device) to perform processes described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program including a transitory machine-readable signal.

In some embodiments, the computer-readable media 128 may store the navigator engine 130 and the data 120. The navigator engine 130 may include one or more of the following modules: an authentication module 202, a data manager module 204, a user interface (UI) module 206, a filter module 208, a report/analytics module 210, a data share module 212, an archive module 214, a scoring module 216, and/or a messaging module 218, which are described in turn. The data 120 may include the table(s) 122, user data 220, a shared library 222, archive data 224, and/or secure data 226. The modules and/or data may be stored together or in a distributed arrangement.

The authentication module 202 may authenticate users, and thus provide users access to the platform and at least some resources of the platform. In some embodiments, users may have different permissions, such as different permissions to access data, modify data, shared data, and so forth. Some users may access the platform as non-registered users, such as users that receive shared data (e.g., a snapshot, etc.), which may enable temporary and restricted access to the platform 102 and restricted access to at least some of the data 120 (i.e., may view only some records that were shared, but not all records). The authentication module 202 may store data in the user data 220, and may enable users to access saved or custom interfaces, data, message, and/or other user profile information in the user data 220.

The data manager module 204 may manage update of the various data sources, such as the public data 108, the third party data 112, and/or the proprietary data 116, as well as update of the data 120 from those data sources. For example, the data manager module 204 may cause retrieval of the public data by executing queries to retrieve public data. The data manager module 204 may update the table 122 from the public data 108, the third party data 112, and/or the proprietary data 116. This may be performed upon detection of a change in the data, at scheduled times (e.g., randomly, at intervals, via a batch process, etc.), and/or in response to other trigger events. The data manager module 204 may control and/or restrict changes to the data by users to avoid redundancy and to prioritize changes when multiple users request changes to the same data. In addition, the data manager module 204 may enforce rules for data types and permissions for changing data, accessing data, and/or deleting data, in accordance with established privileges.

The UI module 206 may generate various user interfaces to graphically display at least some portion of the data 120. The UI module 206 may generate a map interface that displays at least some records spatially via a map, such as by locating markers on a map, generating a heat map, or generating other mapping variations. The UI module 206 may also provide access to data via record views (e.g., cards) or other organized collections of fields of records in the table 122. The UI module 206 may provide access to and interaction with various reports and analytics that leverage the data 120. The UI module 206 may generate UIs by accessing most current data in the table 122, thereby providing real-time access to current information as the underlying data 120 changes based on inputs from other users or sources (e.g., from the data manager module 204, etc.), and over time. Example UIs provided by the UI module 206 are shown and described with reference to FIGS. 4-11. The UI module 206 may present data based on a selected table and/or filter settings/selections. In some embodiments, the platform 102 may enable a user to select a different table of data to interact with using the modules described here. Further, users may select, create, and modify some UIs to enable having a customized interaction with the platform. While some UIs may be common between some users, other users may have customized reports that those users can access. The UI module 206, as well as other modules discussed below, enable the users to customize the UIs and create/customize reports, analytics, and snapshots, for example.

The filter module 208 may generate filter criteria and enable user interaction with the filters to update data presented by the UI module 206. Some filters may be standard in the platform 102, such as filters that leverage the core fields. In some embodiments, the filter module 208 may automatically determine fields that can be used to filter the unstructured data in the table 122 (e.g., columns), and the types of options for filtering using those respective fields, possibly by sampling the data in the table 122. This may be helpful when unstructured data is added to the platform 102. For example, if a new field has values of yes/no, then the filter criteria may be determines as either "yes" or "no". In another example, the filter module 208 may sample data in a field that includes numeric data to determine a range of all values, and possibly range groupings of the data (e.g., 1-10, 11-20, etc.). The filter module 208 may enable users to create filters, which may include user selection of criteria for a field, such as a data type, a range of values, groupings of ranges, and so forth.

The filter module 208 enables users to interact with the data in the table 122 by filtering the data to reduce the number of resulting records (or increase the number when a filter value is modified or filter is removed). The filter module 208 may enable users to filter the data using many criteria. For example, a user may use the filter module 208 to perform a first filter that filters 1000 records to 150 records. The user may then use the filter module 208 to select another filter to further reduce the records to 18 records, for example. The 18 records may be displayed by the UI module 206 on a map or other interface selected by the user. The filter module 208 may use bounds of a map interface as filter criteria is some embodiments, and therefore may limit results to those records having location within the bounds of the map, which can be adjusted by user input (e.g., by zooming, panning, selecting a region/zone, etc.)

The report/analytics module 210 may enable users to generate reports and/or analytics using the filters and a toolset. The toolset may be provided by a third party, such as a data analytics provider. For example, in a commercial real estate context, the report/analytics module 210 may create a report of properties that have a lease expiring in a given time period (e.g., next 180 days). As this report is run over time, the results may change since the data of execution of the report changes. Other reports or analytics may identify preferred properties to lease or buy, current rates, comparable for a selected property, and so forth. As discussed above, a data analytics provide may create tools to extract useful information from the table 122, such as trends, prediction, and/or other useful information. The report/analytics module 210 may save reports/analytics in the shared library, which may enable sharing of the reports/analytics with other users and/or non-registered users as described in further detail with reference to FIG. 14. The report/analytics module 210 may enable generating a snapshot of information for sharing with other users of for a user's later access. The creation of a snapshot is described in further detail with reference to FIG. 17. The snapshot may include a recorded session of interaction with the platform 102, selected data from the table 122, and/or sharing of particular reports and/or analytics for the shared data. Some reports may be stored in the user data 220 when the reports/analytics are not shared.

The data share module 212 may enable sharing of data, such as sharing of snapshots, reports, analytics, and/or other data. In some embodiments, the data share module may create permissions for data that is shared, possibly with assistance of the authentication module 202. For example, a user that creates a report may specify permissions required for other users to access the report. As another example, the data share module 212 may be used to select access rights and a duration of access to data shared to users, such as non-registered users. This may be particularly helpful for sharing snapshots, which may be set to expire after a predetermined amount of time, thereby revoking access to the snapshot by at least some users or non-registered users after expiration of the predetermined amount of time. The privileges and/or access information may be stored in the shared library and/or the user data.

The archive module 214 may create archives of data, which may be used for performance evaluation, for recovery of data, and/or for other reasons. For example, if data is accidently or maliciously deleted or modified, the data may be restored from an archive created by the archive module 214. The archive module 214 may archive all data changes, obtain snapshots at intervals, or both. In some embodiments, the archive module 214 may create dated versions of the tables, which may be used to perform performance metrics over time. For example, as the value of properties changes over time, the archived tables may provide information to see changes in value over time, among other possible uses of the archived data. The archive module 214 may store information (e.g., the archives) in the archive data 224. The archive data may be accessible by the report/analytics to perform some reports as discussed above.

The scoring module 216 may generate scores for records in the table 122. The scoring module 216 may use proprietary algorithms to generate one or more scores for records, such as an overall score, various attributes score, and so forth. The scores may be shared with other entities, possibly via interaction with the platform or by other distribution techniques. The scores may be generated using any combination of the data 120, which may include data from the public data 108, the third party data 112, and/or the proprietary data 116. In the context of commercial real estate, the score module 216 may generate an overall score for a property, a rent score, a forecast score, a risk score, an efficiency score, a social score, a factors score, and/or other scores. The scores may be stored in the table 122 and/or in the shard library 222. Examples of some possible scores are provided below.

Overall Score: An over-all rating based on an analysis of asset strength taking into account many diverse factors ranging from risk and obsolescence to market trends, velocity, product quality, demand, lease roll overs, competitive product, etc.

Rent Score: An estimate of current market rent based on analysis of like kind transactions, demand, transaction velocity and competitive offerings.

Forecast Score: An assessment of potential for rental increase based on historical transaction velocity, existing comparable product, new construction and demand.

Risk Score: A risk rating based on an assortment of factors including historical lease up time, special purpose features, obsolescence, above market build out, concentration risk (single tenant/short lease), lease rollover risk.

Efficiency Score: building efficiency is an assortment of ratios that relate to SF, Expense and rent.

Social Score: an integrated view of historical social media ratings.

Factors Score: A rating based on the degree to which an area contains: Ample low cost water, power, labor, materials; infrastructure; and low risk associated with seismic, flood or natural disaster.

The messaging module 218 may enable users to share communications, notices, reports, analytics, and/or other information with other users of the platform within the entity 118 and possibly external to the entity 118 (e.g., to non-registered users, etc.). In some embodiments, the messaging module 218 may operate similar to a message feed or bulletin board to share updates with users. In various embodiments, the messaging module may operate similar to an electronic message server to transmit messages to designated recipients, such as analogous to an email system or social media feed. The messaging module 218 may distribute user generated content. In some embodiments, the message module 218 may automatically generate messages, such as to distribute content based on updates to the table 122, such as reports, notices of changes, and so forth. Thus, the messaging module 218 may keep users abreast of updates, tools, available resources, and/or other information associated with use of the platform 102.

Figure 3:
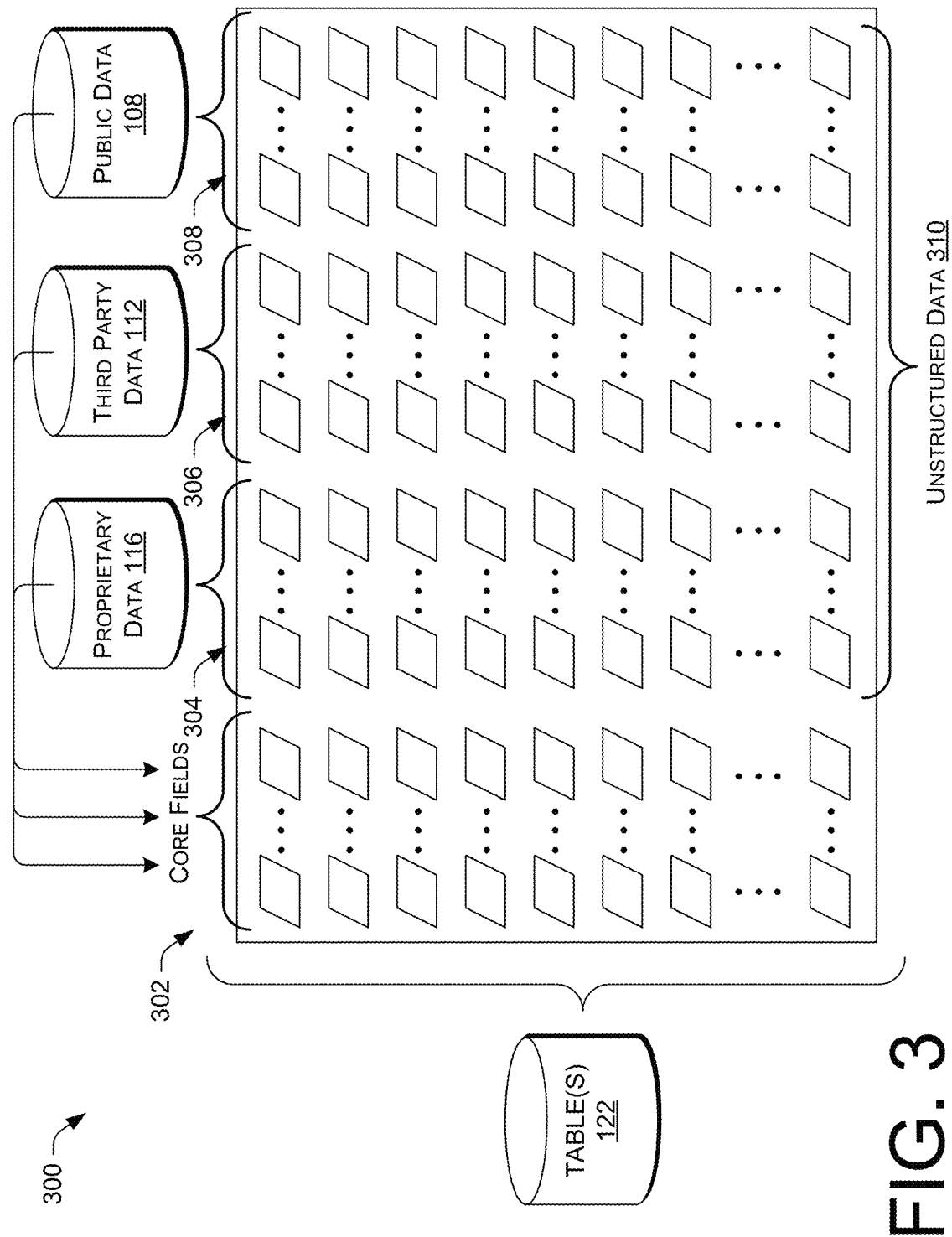
FIG. 3 is a schematic diagram of an illustrative table of unstructured data used by the graphical platform.

FIG. 3 is a schematic diagram of an illustrative table 300 of unstructured data used by the graphical platform. The table 300 is representative of at least one of the tables 122 (possibly the only table used by the platform 102). However, as discussed herein, multiple tables may be used by the platform 102.

The table 300 may include core fields 302, which have preset field names and data types. Examples of the core fields include an address field, a city field, a state field, a zip code field, and so forth. When the data does not include a location, the core fields may include other data that creates a unique record identifier (possibly via aggregation of multiple fields). The core fields may be populated by select data from the public data 108, the third party data 112, and/or the proprietary data 116. Often the core fields will use the same field names and data types since the core fields are selected as data commonly used in the platform 102.

Other fields of the table 300 may be populated by each of the public data 108, the third party data 112, and/or the proprietary data 116. For example, proprietary fields 304 may be populated by the at least some of the proprietary data 116. Third party fields 306 may be populated by the at least some of the third party data 112. Public data fields 308 may be populated by the at least some of the pubic data 108. The fields 304-308 may include unstructured data 310, which may use the naming conventions and data types designated by the entity 118.

FIGS. 4-11 shown illustrative user interfaces (UIs) that show some, but not necessarily every disclosed graphical interface output, tool, or feature of the graphical platform disclosed herein. The UIs show examples of the graphical platform, but do not limit the disclosure to these specific examples. Instead, the UIs show representative graphical outputs that may be used to enable users to have a rich interaction with the unstructured data. Other similar UIs may also be used to enable this rich interaction.

Figure 4:
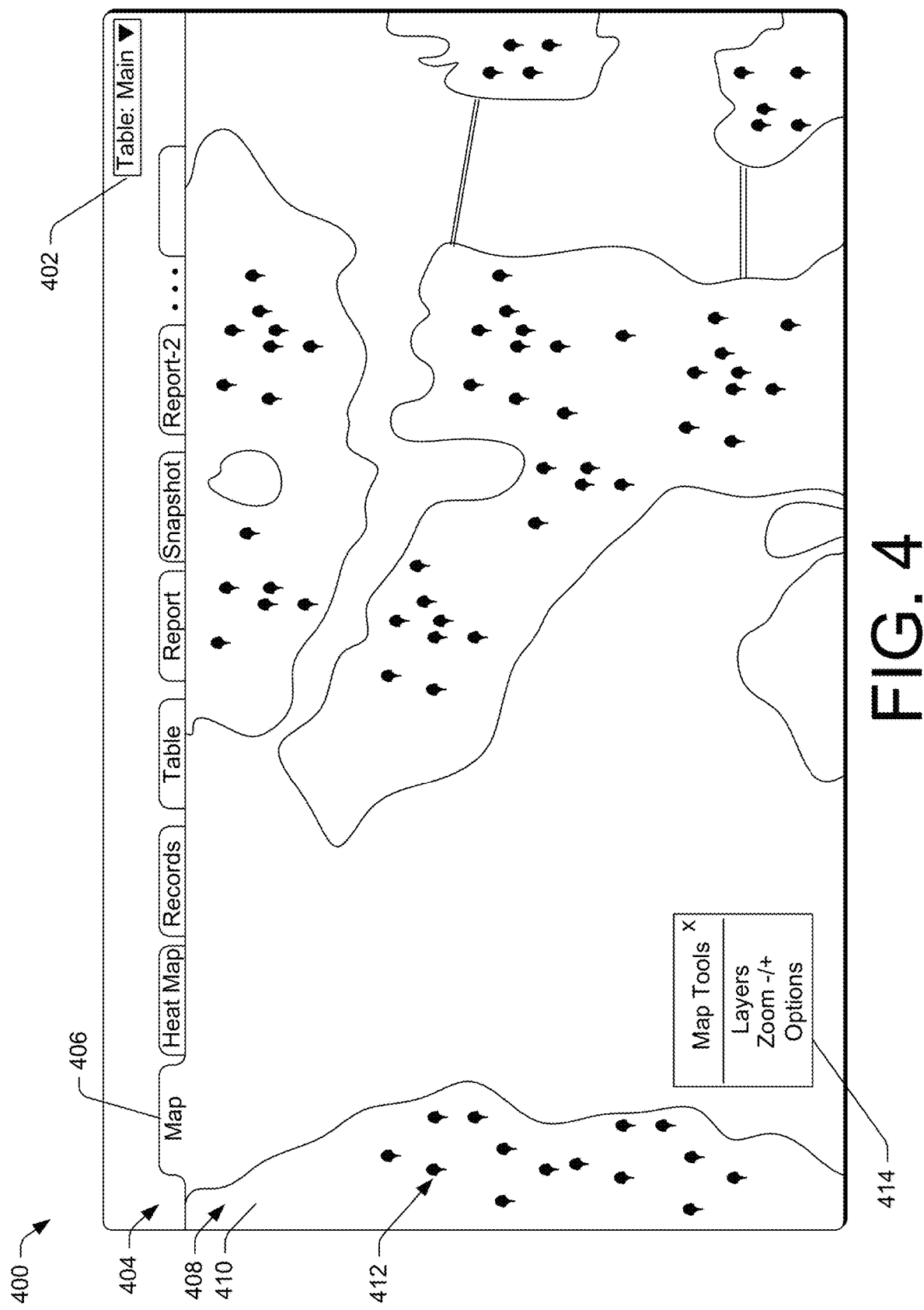
FIG. 4 is an illustrative user interface (UI) that shows a map representing locations associated at least some records of the unstructured data.

FIG. 4 is an illustrative UI 400 that shows a map representing locations associated at least some records of the unstructured data. The UI 400 may include a table selector 402, which may select the table 122 and/or another table used to provide a data to populate the UI 400. The UI 400 may also include tabs 404, which may include a map tab 406, which as shown as selected in the UI 400. Although the UI 400 is shown as using tabs, other selectors may be used to select between different features or interfaces described herein.

In a body 408 of the UI 400, a map 410 is displayed with markers 412 that represent records in the table 122. Each of the markers 412 may represent a location associated with a record in the table 122. The portion of the map 410 shown in the body 408 may determine the records shown in the UI 400. For example, if a user were to zoom out on the map (i.e., enlarge the map) and/or pan the view, additional records may become visible. The records are plotted on the map using information in the fields of the table 122, such as address information. However, other information may be used to locate the records on a map, such as global positioning system units (e.g., latitude, longitude). When the data does not correspond to conventional maps, the data may be plotted on another type of coordinate system. For example, if the data include information about cells of a body, the map may represent the body, and the cells may be located in corresponding positions in the body, for example. In some embodiments, the markers 412 may vary in shape, color, and/or size based on attributes in the fields. For example, the markers may be customized by user interaction via the platform to provide information from other fields in the data, via an "options" menu in a toolbar 414 or accessible via other controls. The toolbar 414 may enable other modifications to the UI 400, such as controlling layers shown in the map (e.g., basic, with streets, satellite view, terrain, etc.). Users may zoom in/out using the toolbar 414 and/or other gestures or controls (e.g., mouse movements, finger movements on a trackpad, etc.), and may also pan the view (move the view up, down, left, right, etc.). Additional features and interaction is shown in the following UIs.

Figure 5:
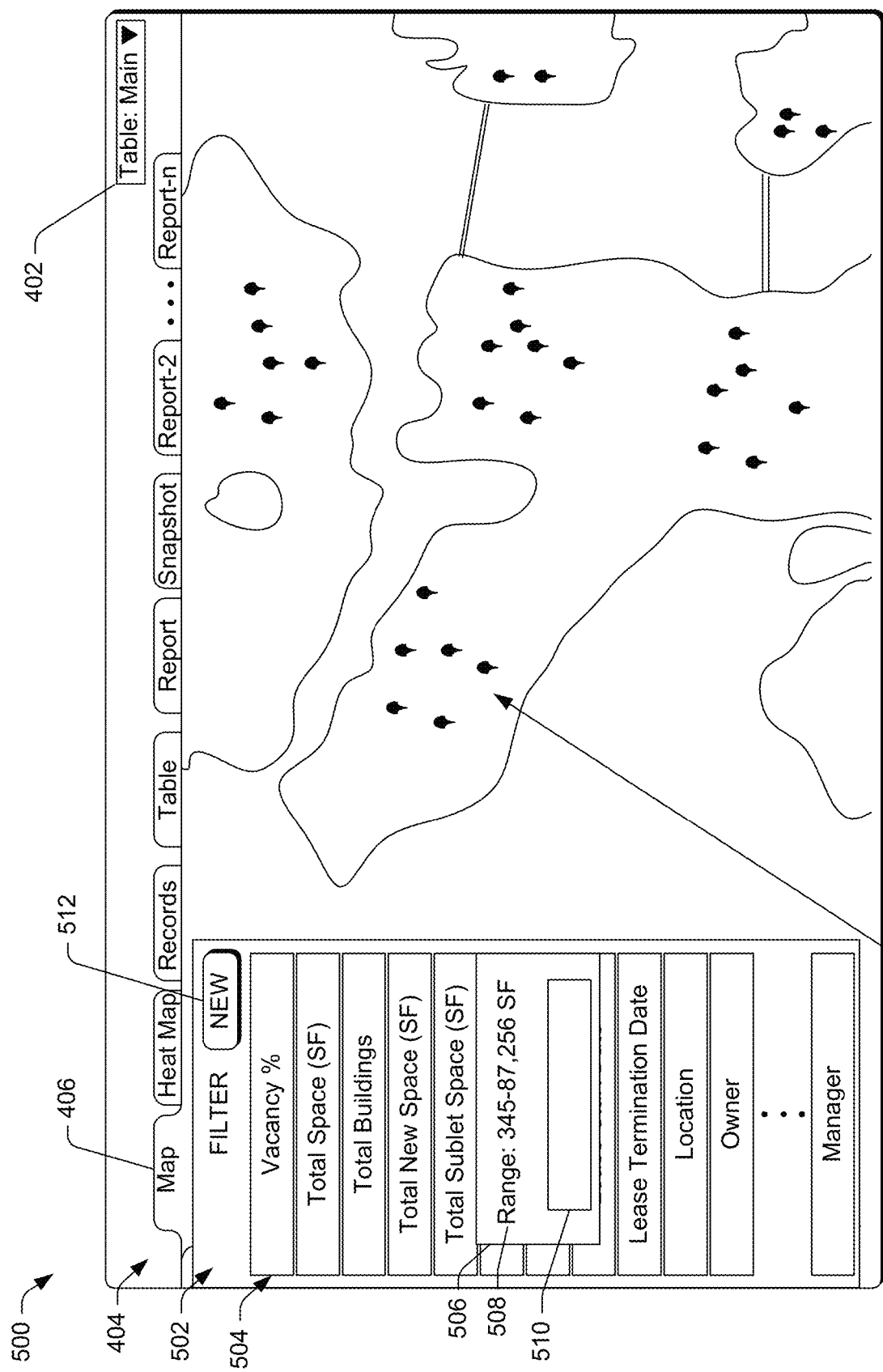
FIG. 5 is an illustrative UI that shows a filter tool used to filter records shown in the map, but also shown in at least some other tabs or UIs discussed herein.

FIG. 5 is an illustrative UI 500 that shows a filter tool 502 used to filter records shown in the map. The filter tool 502 may be revealed from a side of the UI 500 or via other commands, controls, and/or gestures. The filter tool 502 may include a number of filter selectors 504 which may correspond to fields in the table 122. Each filter selector may enable a user to make one or more selections to select a value for the filter selector or a range of values for the filter selector to limit the display of records in the UI 500 (e.g., on the map). An example filter selector 506 is displayed, which may be selected by a user selecting the filter selector (e.g., a click, a hover over control, etc.). The filter selector 506 may include a range of values for the fields, which may be populated by the filter module 208 sampling the data in the table 122. The filter selector 506 may also include an input field, which may enable the user to select a value or range of values for the filter. As shown in the example, the input may be a blank field; however, other selectors such as radial buttons, check boxes, slider bars, and so forth may be used to select the value or range of values. After selection of a filter, the records on shown on the map, via the markers 412, may be updated. A "new" command 512 may enable a user to create a new filter. However, in some embodiments, the filter module 208 may automatically create filter selectors 504 after new fields are added to the table 122.

Figure 6:
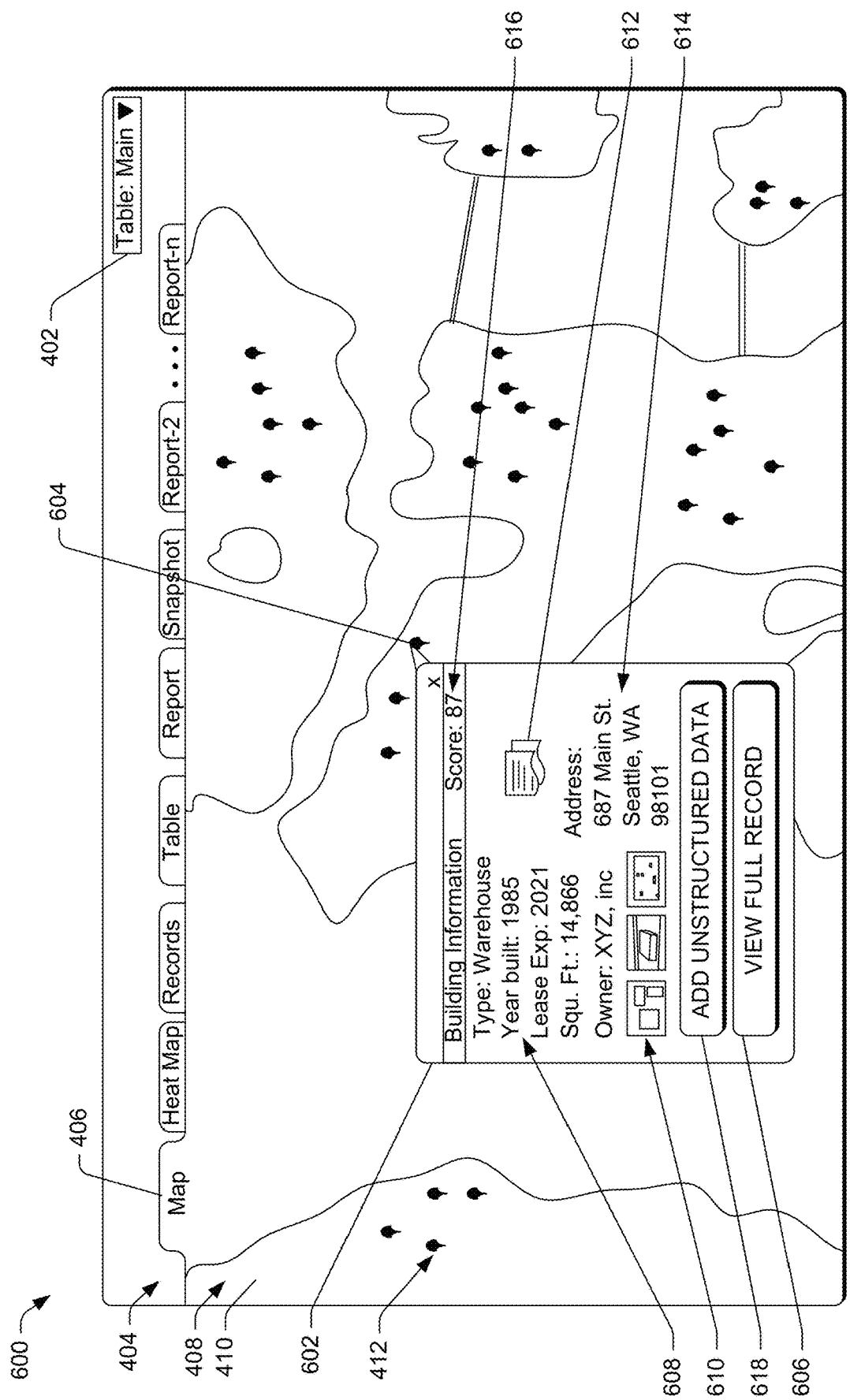
FIG. 6 is an illustrative UI that shows a record (or card) of a selected record from the map.

FIG. 6 is an illustrative UI 600 that shows a record view 602 (or card) of a selected record 604 from the map. The record view 602 may include select information from the fields of the selected record 604. A "view full record" control 606 may enable display of additional information in the record.

As shown, the record view 602 may show selected fields of data 608 from the table 122, which may include a type, a location, and other basic information. The record view 602 may include images 610, which may be associated with the selected record, but stored in a different location (possibly in the secure data 226 and/or shared library 222). The images 610 may be obtained from the public data 108 and/or by users that capture images and upload the imagery as part of the proprietary data 116. The images 610 may include videos, animated or rendered walkthrough interactives, and/or other types of imagery, such as infrared images, and so forth. The record view 602 may include documents 612. The documents 612 may be stored in the secure data 226 and/or shared library 222. For example, the documents may be secured for access only by users have proper privileges, such as users involved in a transaction or other relationship. The documents may be accessed and modified via selection from the record view 602 or other records discussed herein. The record view 602 may include an address 614. The record view 602 may include one or more scores 616, which may be generated by the score module 216.

In some embodiments, the record view 602 may enable a user to create new unstructured data via an "add unstructured data" command 618, which may modify the table 122. Users may add images and/or documents, and/or delete or modify the images/documents via the record view 602. In some embodiments, the images and/or the documents may be accessible in a folder, such as a remotely linked folder that is accessible via the record view 602. For example, the record may include one or more field that stores an address of a folder location for sharing such data.

Figure 7:
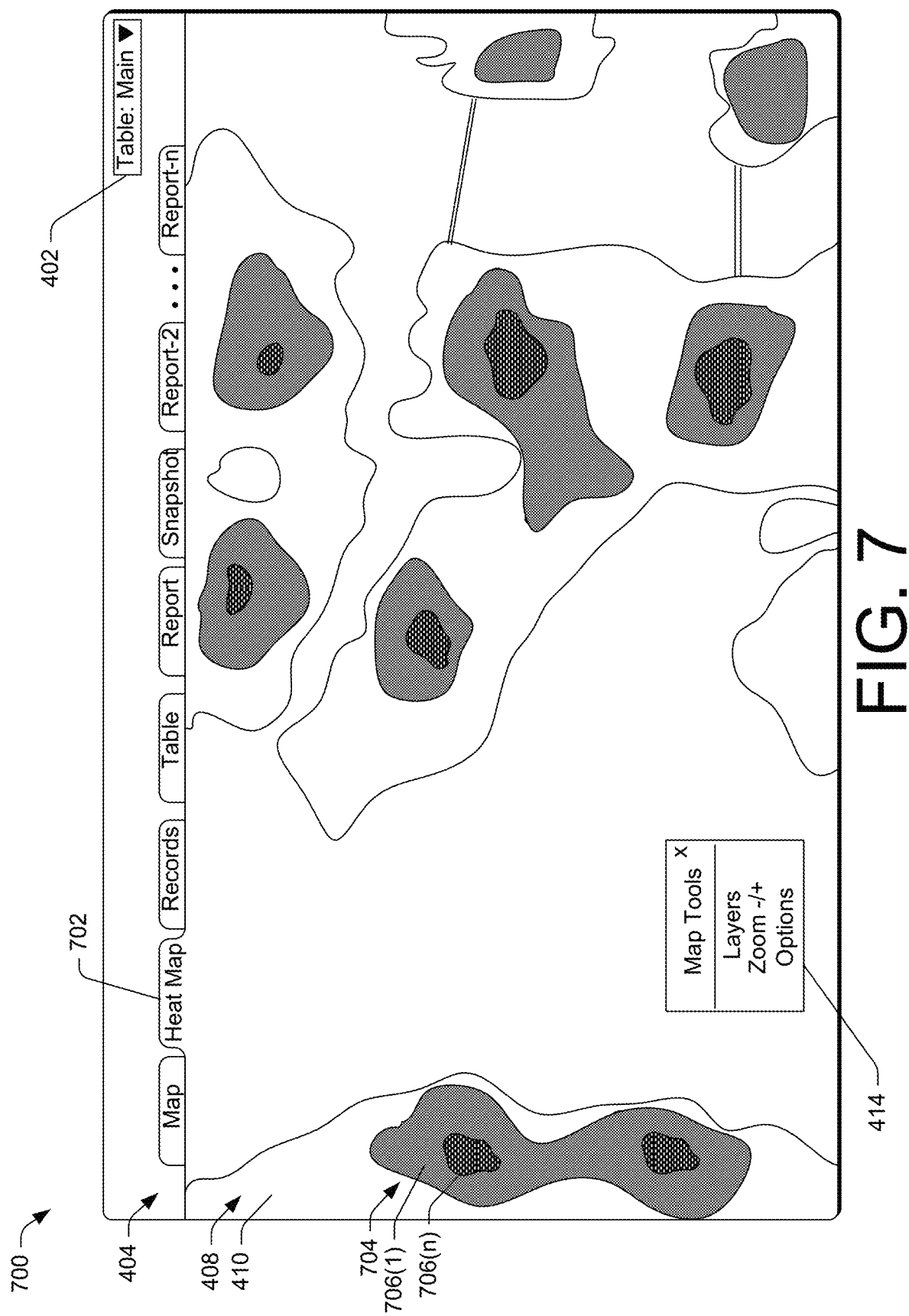
FIG. 7 is an illustrative UI that shows a heat map showing location concentrations of least some records of the unstructured data.

FIG. 7 is an illustrative UI 700 that shows a heat map view 702 showing location concentrations of least some records of the unstructured data. A user may interact with the heat map to obtain information about concentrations 704 of records in a particular view. The concentrations 704 may be coded by various colors/graphics 706(1)-(*n*) to represent different values, such as quantity, value, square feet, or other information. The values shown in the concentrations 704 may be modified by the toolbar 414, such as under an options selector. The platform 102 may enable a user to filter records, via the filter module 208 and graphically shown in the UI 500 of FIG. 5. In addition, prior filters in effect on a different UI (or tab) may be maintained in this UI until the filters are modified or canceled. Thus, a user may interact with the filter to limit records visible. The heat map may be helpful when viewing large amounts of data which may overwhelm a user when viewed with the markers shown in the UI 400 of FIG. 4.

Figure 8:
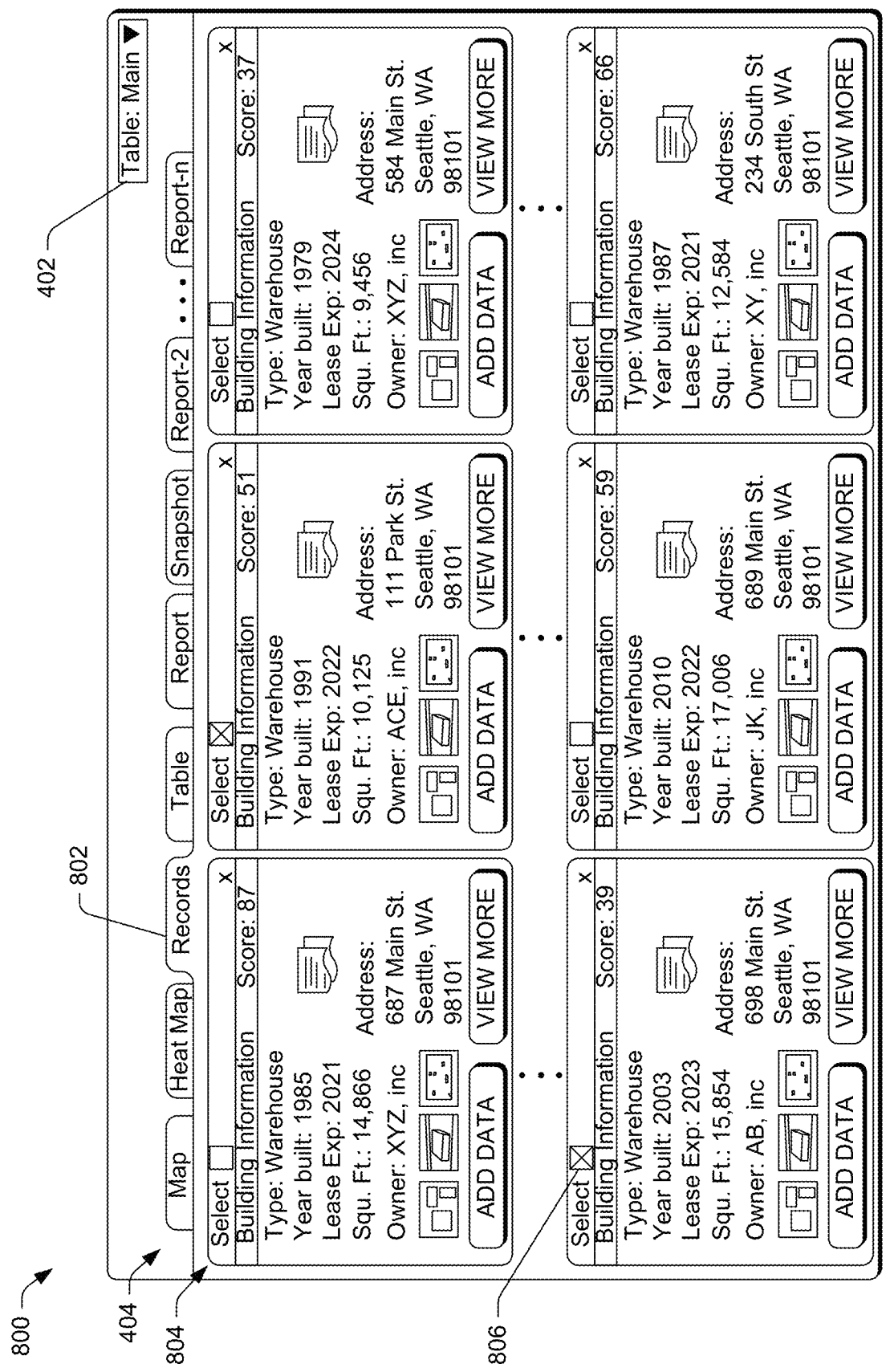
FIG. 8 is an illustrative UI that shows records (or cards) that include data of associated records in the unstructured data.

FIG. 8 is an illustrative UI 800 that shows a records tab 802 that provides view to records views 804 (or cards) that include data of associated records in the unstructured data. The record views 804 may be similar to the record view 602 shown in FIG. 6. The platform 102 may enable a user to filter records, via the filter module 208 and graphically shown in the UI 500 of FIG. 5. In addition, prior filters in effect on a different UI (or tab) may be maintained in this UI until the filters are modified or canceled. Thus, a user may interact with the filter to limit records visible via the records tab 802.

As shown, the record views 804 may show selected fields of data from the table 122, which may include a type, a location, and other basic information. The record views 804 may include images, which may be associated with the selected record, but stored in a different location (possibly in the secure data 226 and/or shared library 222). The images may be obtained from the public data 108 and/or by users that capture images and upload the imagery as part of the proprietary data 116. The images may include videos, animated and/or rendered walkthrough interactives, and/or other types of imagery, such as infrared images, and so forth. The record views 804 may include documents. The documents may be stored in the secure data 226 and/or shared library 222. For example, the documents may be secured for access only by users have proper privileges, such as users involved in a transaction or other relationship. The documents may be accessed and modified via selection from the record views 804 or other records discussed herein. The record views 804 may include an address. The record views 804 may include one or more scores 616, which may be generated by the score module 216.

In some embodiments, the record views 804 may enable a user to create new unstructured data via an "add data" command, which may modify the table 122. Users may add images and/or documents, and/or delete or modify the images/documents via the record views 804. In some embodiments, the images and/or the documents may be accessible in a folder, such as a remotely linked folder that is accessible via the record views 804. For example, the record may include one or more field that stores an address of a folder location for sharing such data.

In some embodiments, the record views 804 may include a selector 806 that enables a user to select the record for future use, such as for a transaction. The selectors may be used to save or filter the records. For example, if a user desires to share three records with another user, or a non-registered user, the user may select the records via the selectors 804. The selectors may expire, be unselected, or otherwise reset for later use.

Figure 9:
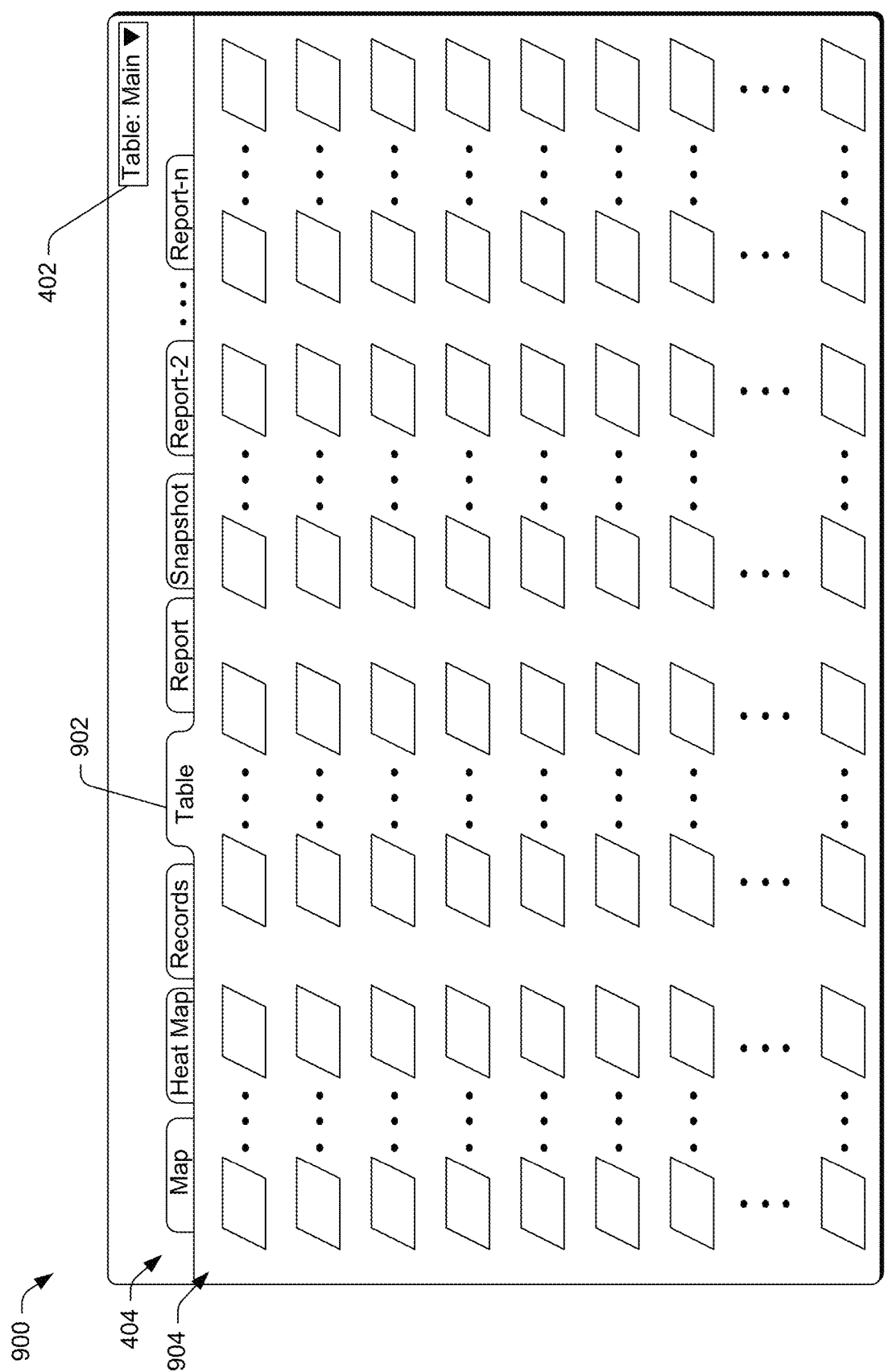
FIG. 9 is an illustrative UI that shows a table that includes records in the unstructured data.

FIG. 9 is an illustrative UI 900 that shows a table tab 902 that provides access to a table 904 that includes records in the unstructured data. The table 904 may show some or all of the data from the table 122, possibly subject to filtering. The platform 102 may enable a user to filter records, via the filter module 208 and graphically shown in the UI 500 of FIG. 5. In addition, prior filters in effect on a different UI (or tab) may be maintained in this UI until the filters are modified or canceled. Thus, a user may interact with the filter to limit records visible via the table tab 902. The table 904 may enable a user to quickly and easily edit data, compare data, and/or share data, among other preferences.

Figure 10:
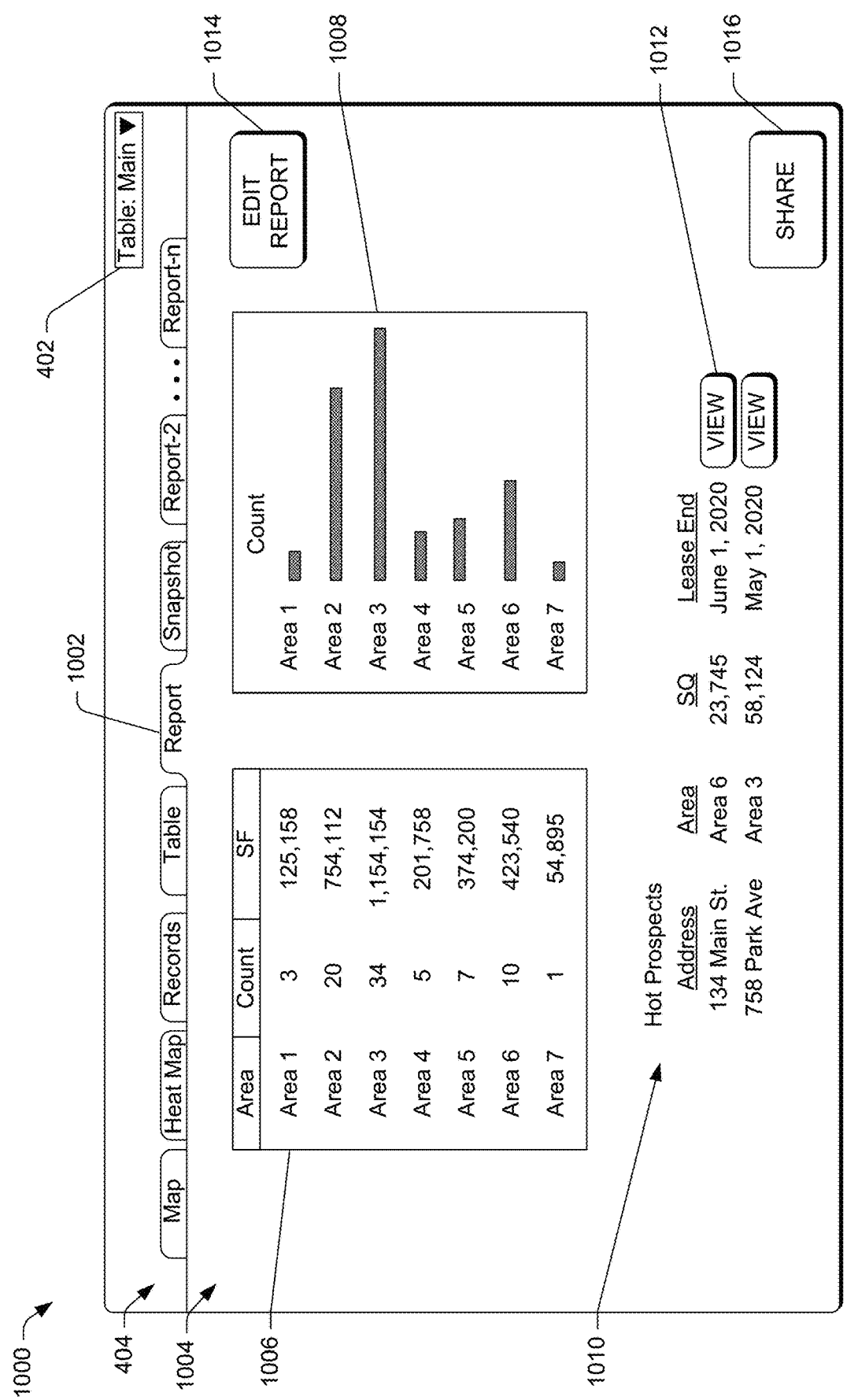
FIG. 10 is an illustrative UI that shows reports and/or analytics based on the unstructured data.

FIG. 10 is an illustrative UI 1000 that shows reports and/or analytics, via a report tab 1002, based on the unstructured data. The reports/analytics may be created by users using the report/analytics module 210. For example, the report/analytics module 210 may enable users to generate reports and/or analytics using the filters and a toolset. The report tab 1002 (and other report tabs) may provide a space to display the reports, which may be updated to reflect real-time information in the table 122. As discussed above, the toolset may be provided by a third party, such as a data analytics provider. For example, in a commercial real estate context, the report/analytics module 210 may create a report of properties that have a lease expiring in a given time period (e.g., next 180 days). As this report is run over time, the results may change since the data of execution of the report changes. Other reports or analytics may identify preferred properties to lease or buy, current rates, comparable for a selected property, and so forth. As discussed above, a data analytics provide may create tools to extract useful information from the table 122, such as trends, prediction, and/or other useful information. The report/analytics module 210 may save reports/analytics in the shared library, which may enable sharing of the reports/analytics with other users and/or non-registered users as described in further detail with reference to FIG. 14.

As shown in the UI 1000 in a reports workspace 1004, one or more reports may be shown. For example a first report 1006 may show a table of data created using a filter. A report 1008 may show a graphical output related to the first report or based on other information. A third report 1010 may include analytics that provide important data, such as time sensitive information, forecasted information, or other information derived from the table data 124 of the table 122. Some reports may include commands 1012 that enable users to access additional information related to a report of data. The reports, after creation, may be edited via an edit command 1014. In some embodiments, the report may be shared with other user or non-registered users via a share command 1016 implemented via the data sharing module 212.

To create a report, a user may access an empty tab (or create a new tab). The new tab may include a toolset to create reports and/or analytics, possibly provided by a data analytics provider. In some embodiments, the toolset may provide prompts to guide user creation of reports. In various embodiments, the report may be generated by saving a filtered version of a different tab, such as a snapshot of the table view, the record view, the map, or the heat map described above.

Figure 11:
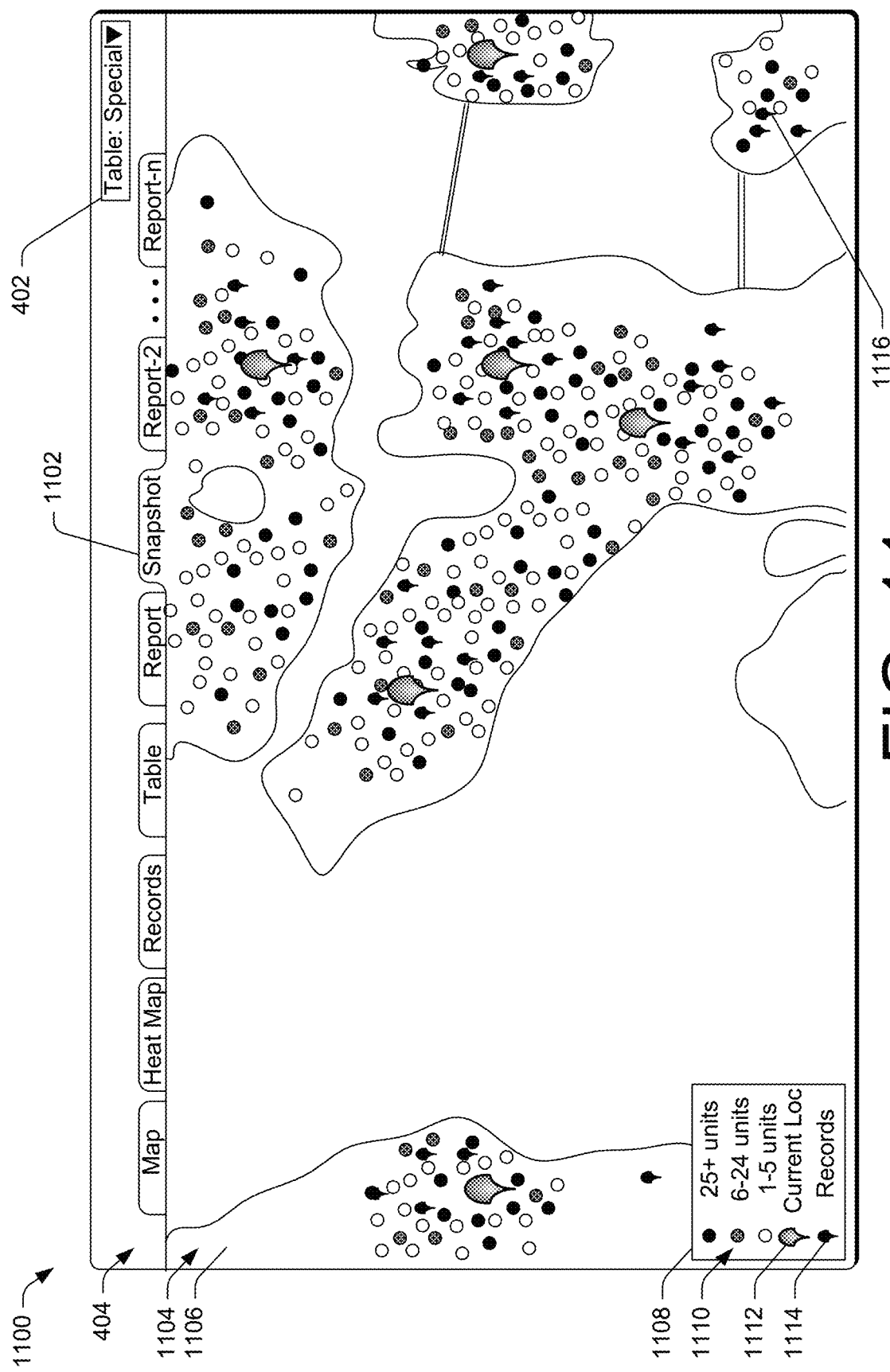
FIG. 11 is an illustrative UI that shows a snapshot that includes a bucket view of data overlaid with records shown on a map.

FIG. 11 is an illustrative UI 1100 that shows a snapshot tab 1102 showing a snapshot 1104 that includes a bucket view of data overlaid with records shown on a map 1106. The illustrative snapshot 1104 may be created using the toolset and/or by filtering data, and also by overlaying additional data that is bucketed (e.g., grouped in ranges), as indicated by a key 1108. For example, the bucketed data may include three ranges as shown in the key (or possibly more or fewer). As an example, the bucketed data may represent people, items, units, things, amounts, or other information that may be graphically displayed on the map. The report/analytics module 210 may enable generating the snapshot of information for sharing. The snapshot creating is described in further detail with reference to FIG. 17. The snapshot may include a recorded session of interaction with the platform 102, selected data from the table 122, and/or sharing of particular reports and/or analytics for the shared data.

The key 1108 indicates definitions for the bucketed data 1110, as well as definitions for other data, such as current locations 1112 and records 1114 (shown as markers similar to the UI 400). In an example, an entity may want to determine new properties to acquire based on the placement and density of the bucketed units. The snapshot may indicate, via the map 1106, the location of the current locations 1112. The records 1114 may indicate available locations, which may possibly be acquired by the entity or user. For example, the entity or user may identify a record 1116 as a record of interest based on analysis of the snapshot 1104. A user may then access more information via the record as described above, such as by selecting the record.

As shown in FIG. 11, the platform 102 may enable users to overlay table data with other table data to enable users to create informed decisions using graphical outputs (user interfaces) provided by the platform 102. Thus, users may quickly analyze the data in the table 122 to find records that best suit one's desires or requirements. Many different types of snapshots may be created by adding (e.g., layering, etc.) tables of data or fields into an existing table and filtering results, which may be viewable on a map, viewable on a heat map as shown in UI 700, viewable in record views (cards) as shown in the UI 800, shown in the table as shown in UI 900.

FIGS. 12-17 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 12:
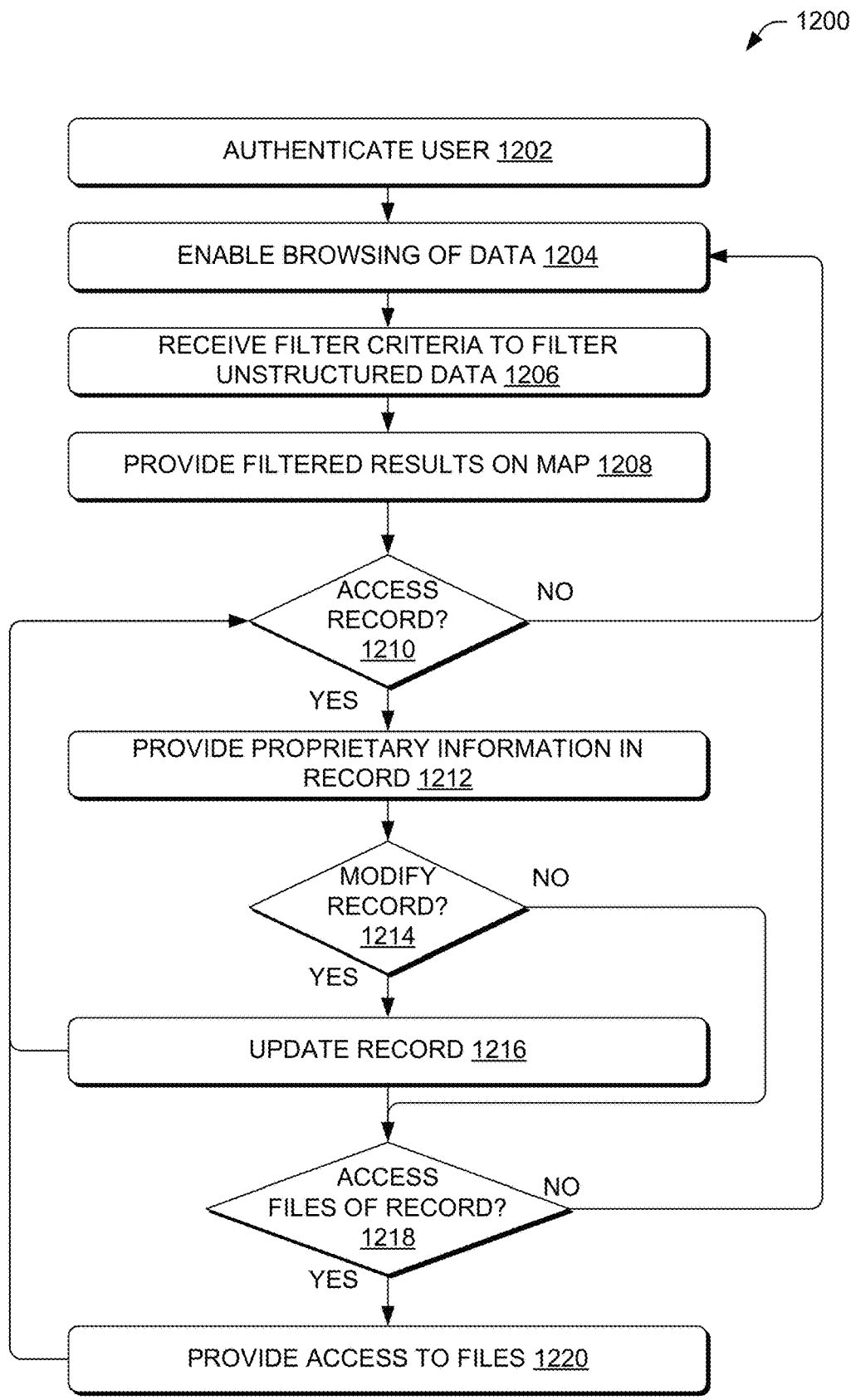
FIG. 12 is a flow diagram of an illustrative process to enable user interaction with unstructured data using a graphical platform.

FIG. 12 is a flow diagram of an illustrative process 1200 to enable user interaction with unstructured data using a graphical platform. The process 1200 is described with reference to the environment 100 and the computing architecture 200. Of course, the process 1200 may be performed in other similar and/or different environments.

At 1202, a user may be authenticated to gain access to the graphical platform 102 to interact with the unstructured data. The authentication may include submission of login credentials, access via an authenticated device, and/or other types of authentication.

At 1204, the platform 102 may enable the user to browse data by interacting with the map or any other interface of data, performing filters, viewing reports, and/or otherwise interacting with the data via the interfaces. For example, the user may adjust the bounds of a map by zooming in on an area of interest to the user; panning; selecting a district, a suburb, a zone, or another area, and so forth.

At 1206, the platform 102 may receive filter criteria and a request to filter records using the filter criteria. For example, the user may select a filter selector and specify filter criteria, such as values or ranges of values, which may reduce the number of records shown in one or more of the user interfaces. The filter may be used one or more times to enable the user to narrow down records to view records of interest to the user. Changes to the filter may also increase results (e.g., broadening of criteria). The filter may later be reset to show all or more results.

At 1208, the platform 102 may provide the filtered records on the map, possibly by removing markers or other indicators associated with the filtered (removed) records that were previously visible prior to execution of the filter or latest change to the filter.

At 1210, the platform 102 may determine whether a record is selected. When a record is not selected (via the "no" route from the decision operation 1210), then the process 1200 may advance to the operation 1204 and continue processing. However, when a record is selected (via the "yes" route from the decision operation 1210), then the process 1200 may advance to an operation 1212.

At 1212, the platform 102 provides at least some of the proprietary information in the record, possibly along with other select information. The record may be presented as a card or record view, which may provide a format to interact with the data, with images, and/or with documents associated with the record. As discussed above, the images may include videos, walk through interactives, and/or other imagery. The record view may enable the user to access most or all data in the record that the user has privileges to access. Some data may not be accessible by a user due to privilege (security) protocols, and thus may be withheld from some users.

At 1214, the platform 102 may determine whether a request to modify data is present. When a request to modify data (e.g., add data, delete data, change data, etc.) is received (via the "yes" route from the decision operation 1214), then the process 1200 may advance to an operation 1216 to update the record accordingly, assuming the user has privileges to make such modifications. The platform 102 may enable the user to modify information about the record via the record view, such as to add new data, delete data, and/or change values.

Following the operation 1216, or when a request to modify data (e.g., add data, delete data, change data, etc.) is not received (via the "no" route from the decision operation 1214), then the process 1200 may advance to a decision operation 1218. At 1218, the platform 102 may determine whether a request to access files (e.g., images, documents, etc.) associated with the record is received. When a request to access files is not received (following the "no" route from the decision operation 1218), then the process 1200 may advance to the operation 1204. When a request to access files is received (following the "yes" route from the decision operation 1218), then the process 1200 may advance to an operation 1220.

At 1220, the platform 102 may provide access to the files when the user has privileges to access such files. Some files or file repositories may require special privileges to access the data within such repositories. When access is allowed, the platform 102 may enable access to files such as images (including videos, interactives, and/or other imagery), documents, and/or other files. In some instances, the platform may enable the user to add, modify, or delete files associated with the record. When access is not allowed, the process 1200 may follow the "no" route from the decision operation 1218, and the process 1200 may advance to the operation 1204

Figure 13:
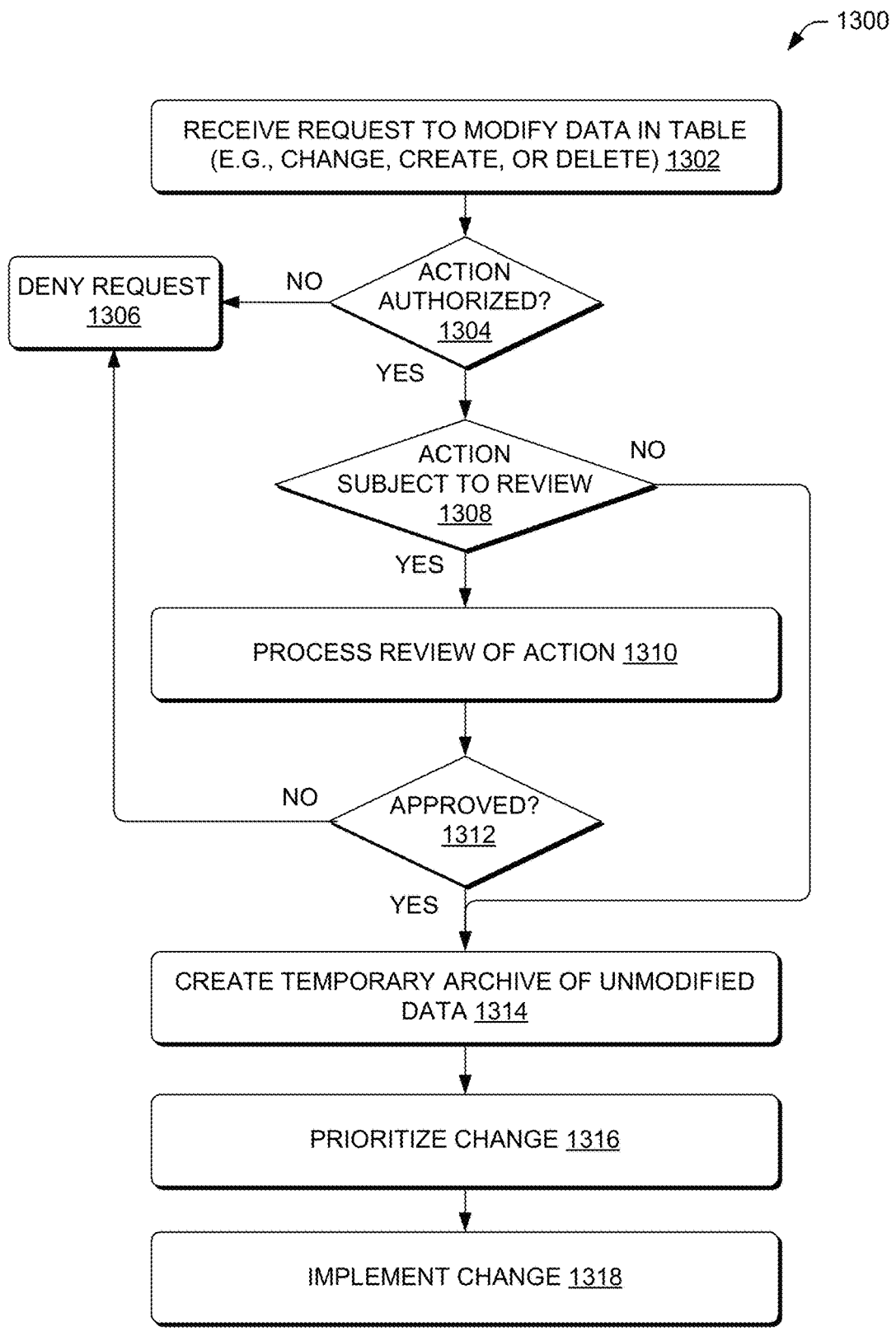
FIG. 13 is a flow diagram of an illustrative process for modifying, creating, or deleting data in the unstructured data.

FIG. 13 is a flow diagram of an illustrative process 1300 for modifying, creating, or deleting data in the unstructured data. The process 1300 is described with reference to the environment 100 and the computing architecture 200. Of course, the process 1300 may be performed in other similar and/or different environments.

At 1302, the platform 102 may receive a request to modify data in the table 122 (e.g., change, create, or delete data). For example, the request may be received at the operation 1216 in the process 1200.

At 1304, the platform 102 may determine whether the modification is authorized. The authorization may be determined by inspecting privileges associated with the user (e.g., possibly stored in the user data 220), whether the data is write-protected and able to be modified, and/or by inspecting other information (e.g., has another user updated the data first, etc.).

When the action is not authorized for any of the reasons discussed above or for other reasons (following the "no" route from the decision operation 1204), the process 1300 may advance to an operation 1306 and deny the request. When the action is authorized (following the "yes" route from the decision operation 1204), the process 1300 may advance to a decision operation 1308.

At 1308, the decision operation may determine whether the modification requires review and/or approval by another party. For example, some changes may be subject to review by a committee, a supervisor, an interested party, etc. Some changes may be subject to random review. When the modification is subject to review (following the "yes" route from the decision operation 1308), the process 1300 may advance to an operation 1310.

At 1310, the platform 102 may receive a response of an approval or denial of the modification. In some instances, the modification may be denied without human inspection, such as when the change does not conform to a data type or other set parameters for values or entries.

At 1312, the platform 102 may determine whether the modification is approved in response to received response at the operation 1310. When the response is a denial (following the "no" route from the decision operation 1312), the process 1300 may advance to the operation 1306 and deny the request. When the response is an approval (following the "yes" route from the decision operation 1312), or when the modification is not subject to review (following the "no" route from the decision operation 1308), the process 1300 may advance to an operation 1314.

At 1314, the platform may create a temporary archive of the unmodified data, when data is changed or deleted. The archive may enable restoring the values at a later point in time if requested.

At 1316, the platform 102 may prioritize the change, which may cause the change to be implemented over a conflicting request received from another user via a reconciliation process, for example.

At 1318, the platform 102 may update the record of the table 122 to reflect the requested change. For example, when the change is has a greatest priority and/or when no conflicting requests are received.

Figure 14:
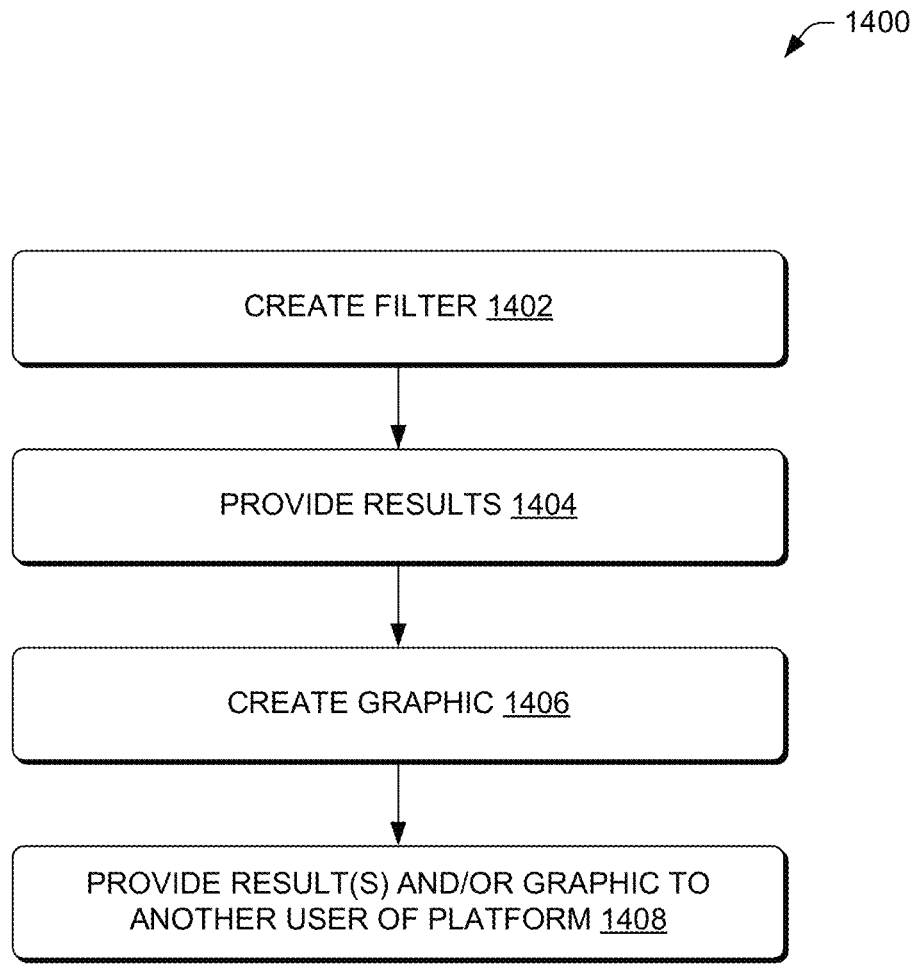
FIG. 14 is a flow diagram of an illustrative process to create sharable reports and/or analytics using the graphical platform.

FIG. 14 is a flow diagram of an illustrative process 1400 to create sharable reports and/or analytics using the graphical platform. The process 1400 is described with reference to the environment 100 and the computing architecture 200. Of course, the process 1400 may be performed in other similar and/or different environments.

At 1402, the platform 102 may receive a request to implement a filter of data in the table 122. The filter module 208 may execute the filter and provide filtered results. The filtered results may be records that satisfy criteria of the filter.

At 1404, the platform 102 may provide the resulting records for presentation to the user via one of the user interfaces described herein, such as a map UI, a record UI, and/or any other UI.

At 1406, the platform 102 may create a graphic to facilitate display of the results. The graphic may be display of the results on a map, on a record view, or other graphic. In some embodiments, the graphic may be provided by a data analytics provider, such as the graphic associated with the reports 1006, 1008, and/or 1010 shown in FIG. 10. The graphics may include charts, formatted tables, and/or other graphical displays that convey the records and at least some data in the records to users.

At 1408, the platform 102 may provide the result(s) and/or the graphics to another user of the platform or possibly to a non-registered user. When information is provided to a non-registered user, temporary privileges may be granted to enable access to the information via the platform 102 by the non-registered user. The information may be presented via a new tab, via a link, via a message provided by the message module 218, and/or via other techniques discussed here.

Figure 15:
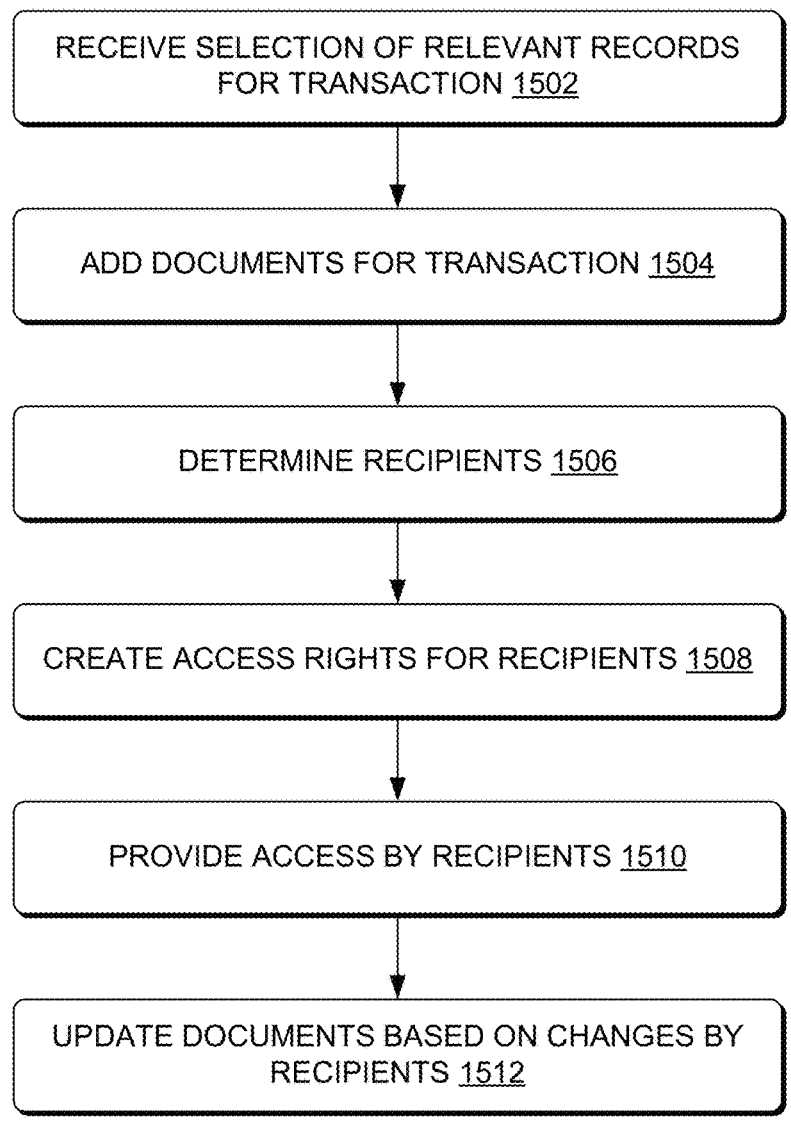
FIG. 15 is a flow diagram of an illustrative process to facilitate a transaction using the graphical platform.

FIG. 15 is a flow diagram of an illustrative process 1500 to facilitate a transaction using the graphical platform. The process 1500 is described with reference to the environment 100 and the computing architecture 200. Of course, the process 1500 may be performed in other similar and/or different environments.

At 1502, the platform 102 may receive a selection of relevant records for a transaction. Records may be selected via the selector discussed with reference to FIG. 8, by executing filters, and/or by manually selecting records. The transaction may be any type of offer, solicitation, delivery, presentation, or other conveyance of information to another party.

At 1504, the platform 102 may add documents for association with the record(s) for the transaction. The documents may provide context for the transaction and/or may be executable documents to bind parties to terms of an offer (e.g., contracts, agreements, etc.). The documents may provide virtually any information to assist or further objectives of the transaction.

At 1506, the platform 102 may receive recipients that are to receive the records and documents (e.g., the party or parties to the transaction, including other interested entities or persons).

At 1508, the platform 102 may receive permissions for the parties. The permissions may include access rights, temporary access to the platform and relevant data form the operations 1502 and 1504, privileges to modify records and/or documents, and so forth.

At 1510, the platform 102 may provide the records and/or documents to the recipients. For example, the platform 102 may authenticate the recipients and provide access to the records and/or the documents.

At 1512, the platform 102 may update documents and/or records in response to interactions by the recipients. For example, the platform 102 may save a change to a document, such as a signature or modification. In some instances, the platform 102 may notify an interested party of a change to a record and/or a change to a document, possibly via the message module 218.

Figure 16:
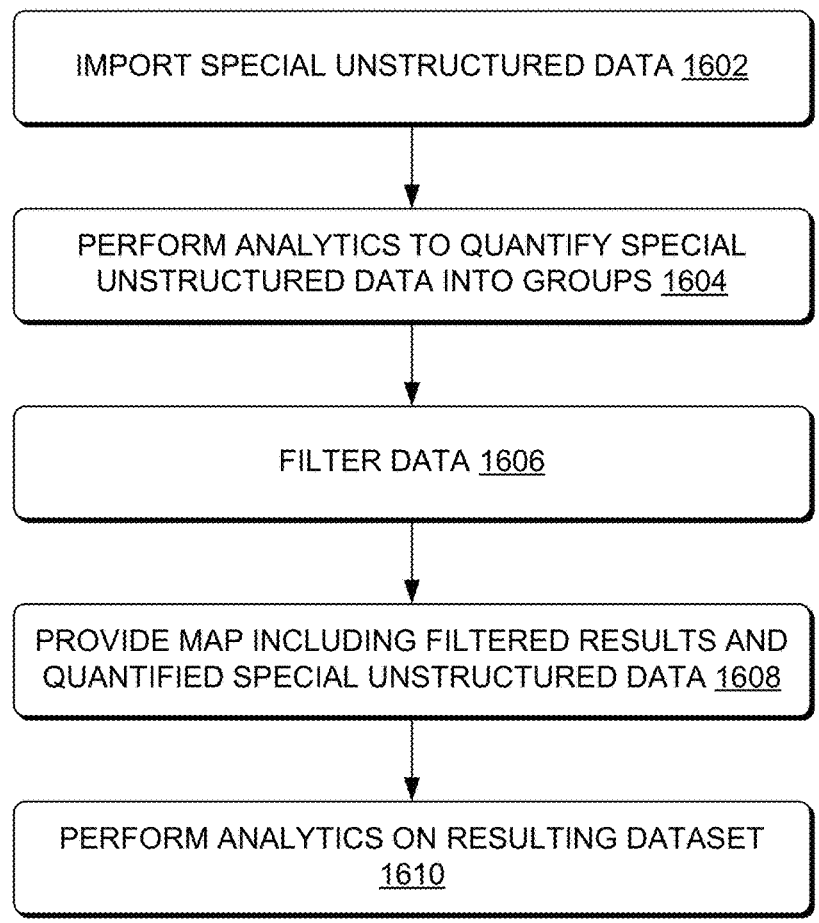
FIG. 16 is a flow diagram of an illustrative process to overlay special unstructured data using the graphical platform to perform advanced analytics.

FIG. 16 is a flow diagram of an illustrative process 1600 to overlay special unstructured data using the graphical platform to perform advanced analytics. The process 1600 is described with reference to the environment 100 and the computing architecture 200. Of course, the process 1600 may be performed in other similar and/or different environments.

At 1602, the platform 102 may receive special unstructured data for import. The special unstructured data may be associated with the data in the table 122, such as by including location information or other information that enable combining or laying the special unstructured data with the table data 124. In an example, the special unstructured data may include locations and values associated with the location. The values may be sums of money, a size, a quantity, and/or other things represented by values.

At 1604, the platform 102 may perform analytics to quantify the special unstructured data into groups (or buckets). For example, the data may include values ranging from a minimum value to a maximum value. Groups (or buckets) may be generated automatically or manually to group data (e.g., into ranges or other groups), such as shown in FIG. 11.

At 1606, the platform 102 may filter the table data 124 in the table 122 to provide an output of filtered records for view in a user interface.

At 1608, the platform 102 may present the filtered data from the operation 1606 and at least some of the special unstructured data, possibly via groupings or buckets, on a map or other graphical representation. For example, the platform 102 may display the buckets or groups via different visual representations explained in a key (e.g., different colors, patterns, shapes, etc.).

In some embodiments, at 1610, the platform 102 may perform analytics on the results provided in the operation 1608. For example, when the output is a display of units and available properties, where the user desired to identify properties closest to large groupings of units, the analytics may assist in identifying top candidate properties, such as by using algorithms that factor distances, units, and other information to create measurable results. However, in various embodiments, the analytics may not be performed by the platform 102.

Figure 17:
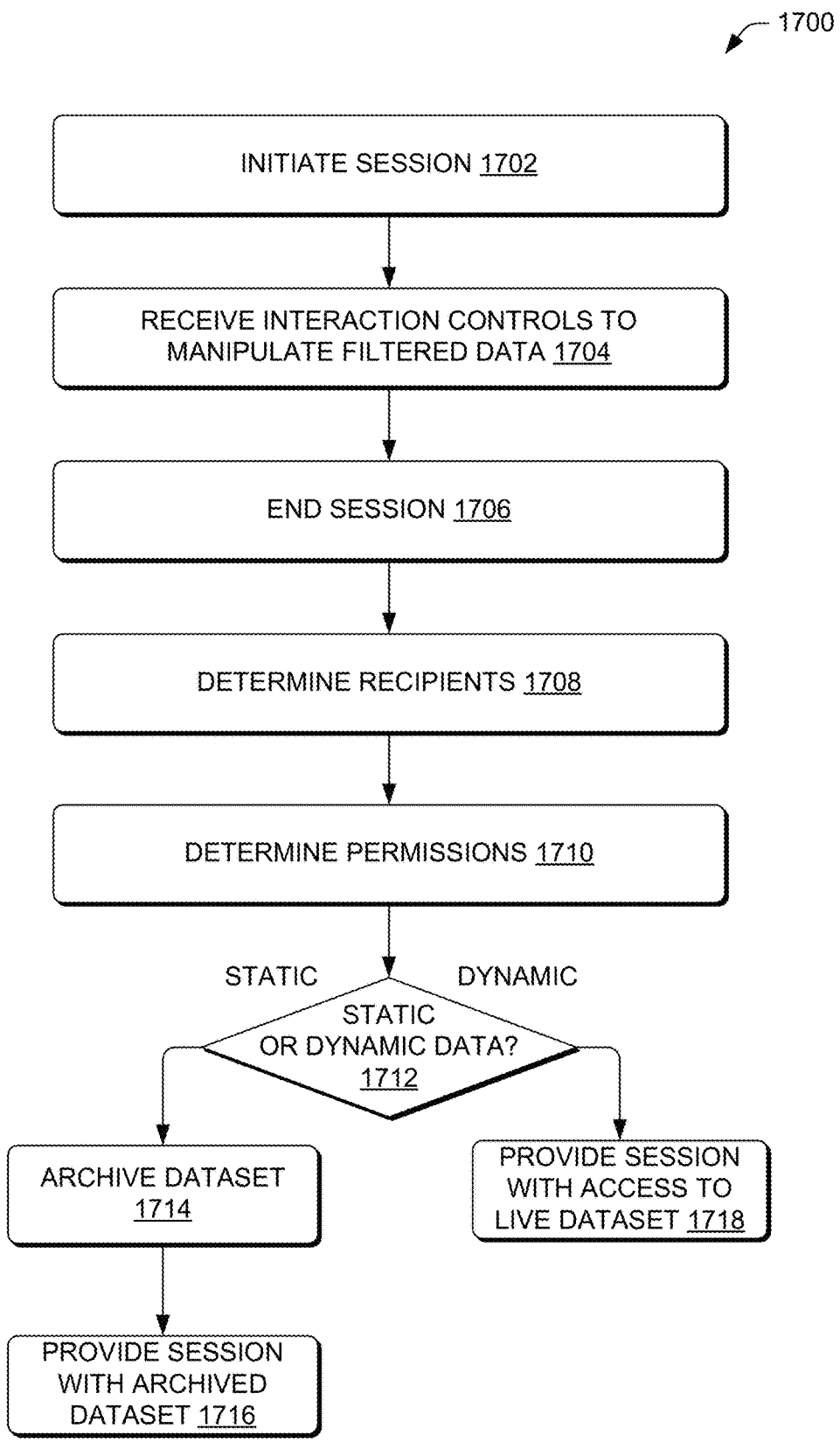
FIG. 17 is a flow diagram of an illustrative process to create a snapshot of static or dynamic data that can be shared with registered and/or non-registered users of the graphical platform.

FIG. 17 is a flow diagram of an illustrative process 1700 to create a snapshot of static or dynamic data that can be shared with registered and/or non-registered users of the graphical platform. The process 1700 is described with reference to the environment 100 and the computing architecture 200. Of course, the process 1700 may be performed in other similar and/or different environments.

At 1702, the platform 102 may initiate a session, possibly by receiving a user input command. The session may be a start of a saved or record interaction, which may be shared with other user and/or non-registered users. For example, the interaction may highlight data that may be used in a presentation or be of interest to other users. However, unlike a recorded video, the interaction may be modified and/or explored by recipients via further action through the platform 102 by the recipients.

At 1704, the platform 102 may receive interaction controls by a user, such filter commands and resulting actions, exploration of records, access to image/documents in records, panning/zooming in a map view, and/or other interaction data. During the interaction, the platform 102 may determine records associated with the session, which may be a subset of the records in the table 122.

At 1706, the platform 102 may receive an indication of an end of a session, possibly via a user input command. The platform 102 may end the session. The session may be defined or encapsulate the interactions of data between the operations 1702 and 1706. In some embodiments, the platform 102 may enable review of the session and may enable the user to edit the session after capture of the information.

At 1708, the platform 102 may receive designation of recipients to receive access to the interaction session and at least some of the records accessed during the session.

At 1710, the platform 102 may receive designation of privileges of the user that have access to the captured session. The privileges may include duration of access, modification privileges, data access privileges, file access privileges, and other privileges discussed herein.

At 1712, the platform 102 may determine whether to provide recipients access to a live, dynamic version of the table 122 (i.e., a rea-time version) or a static, archived version that is saved after the interaction operation 1704, which does not change and does not reflect forward changes to the data.

When the recipients are provided a static table (following the "static" route from the decision operation 1712, then the process 1700 may advance to an operation 1714. At 1714, the platform may archive the table to create a static table. At 1716, the platform 102 may provide access to the recipients of the interactive session, which includes access to the static table.

When the recipients are provided a dynamic table (following the "dynamic" route from the decision operation 1712, then the process 1700 may advance to an operation 1718. At 1718, the platform 102 may provide access to the recipients of the interactive session, which includes access to the real-time table 122 which changes due to updates after the end of the session at the operation 1706.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors;
   one or more data stores storing:
   structured data including one or more fields that define one or more entities, the structured data comprising at least publicly available data and private internal data; and
   unstructured data associated with the structured data, the unstructured data including user-defined fields that are added to the structured data during manipulation with a data record, the unstructured data including proprietary data that is unavailable to unauthorized users; and memory storing computer-executable instructions that, when executed, cause the one or more processors to perform operations comprising:

receiving an input from a user via a first interaction with a graphical user interface (GUI), the input defining an attribute;

identifying, from the structured data, an entity of the one or more entities based at least in part on the attribute;

presenting a representation of the entity in the GUI;

receiving a selection of the entity via a second interaction with the GUI;

determining the user is authorized to access of a portion of the unstructured data specific to the entity;

presenting, in response to determining the user is authorized to access, a card that includes at least some of the structured data and the portion of the unstructured data specific to the entity;

receiving a request to add data, via the card, to the unstructured data;

adding a field that includes the data to the unstructured data; and storing the field including the data in the one or more data stores.

2. The system of claim 1, the operations further comprising generating a score for the entity, the score based at least in part on the structured data or the unstructured data, wherein presenting the card further comprises presenting the score.

3. The system of claim 2, wherein the score is generated based at least in part on a comparison of the entity to another entity of the one or more entities.

4. The system of claim 1, wherein the GUI comprises a heat map displaying a concentration of at least a portion of the one or more entities, the concentration associated with a visual representation of different values for the attribute.

5. The system of claim 1, wherein the GUI displays the one or more entities grouped into ranges associated with the attribute.

6. The system of claim 1, the operations further comprising updating the publicly available data based at least in part on the field added to the unstructured data.

7. The system of claim 1, the operations further comprising:

receiving a request to share the card with a recipient, the card including at least some of the structured data and the unstructured data that is specific to the entity;

creating authentication data to permit access to the card by the recipient; and sharing, to the recipient and in response to receipt of the authentication data, the card.

8. A method comprising:

receiving, via a user interface, an indication of an attribute describing one or more entities;

identifying an entity of multiple entities from a data store based at least in part on the attribute, the data store including unstructured proprietary data associated with individual entities of the multiple entities, the unstructured proprietary data being unavailable to at least one unauthorized recipient;

displaying the entity via the user interface;

receiving a selection of the entity by a user via an interaction with the user interface;

determining the user is authorized to access the unstructured proprietary data specific to the entity based at least in part on authentication data associated with the user;

displaying, in response to determining the user is authorized to access the unstructured proprietary data, a card via the user interface that includes non-proprietary data and the unstructured proprietary data specific to the entity;

receiving a request to add new data to the unstructured proprietary data included with the card;

adding the new data to the unstructured proprietary data included with the card; and publishing the new data to the data store for access by other authorized users.

9. The method of claim 8, further comprising creating an archive of the data store prior to adding the new data to the unstructured proprietary data included with the card.

10. The method of claim 8, further comprising determining the new data is proprietary data.

11. The method of claim 8, further comprising:

receiving a request to share the card with a recipient;

determining that the recipient is permitted to access the card based at least in part on authentication data associated with the recipient; and sharing, with the recipient, and in response to the authentication data, the card.

12. The method of claim 11, wherein the card is dynamically updated in response to changes to the unstructured proprietary data, and wherein sharing the card includes presenting dynamic updates to the recipient.

13. The method of claim 8, wherein the entity is a first entity, the method further comprising:

displaying, in the user interface, the first entity at a first location relative to other entities of the multiple entities;

determining a second location of a second entity relative to the first location of the first entity;

determining a first range of values associated with the first entity and a second range of values associated with the second entity; and displaying a first icon associated with the first range of values at the first location and a second icon associated with the second range of values at the second location in the user interface.

14. The method of claim 8, further comprising:

receiving a second request to add second data to the first unstructured proprietary data;

determining whether the second data is consistent with the unstructured proprietary data or the new data; and adding the second data to the unstructured proprietary data responsive to the second data being consistent with the unstructured proprietary data and the new data.

15. The method of claim 8, wherein the unstructured proprietary data comprises at least one customized name or datatype, datapoint, or field associated with a streamed content.

16. One or more non-transitory computer-readable media storing instructions that, when executed by one or more processors, perform operations comprising:

displaying a plurality of query fields that correspond to different data types, the different data types including unstructured data and structured data;

receiving an input from a user at a query field of the plurality of query fields;

determining a result based at least in part on the input;

determining the user of is authorized to access at least a portion of data associated with the result;

presenting the result, in response to the input and determining the user is authorized, via a graphical user interface (GUI);

receiving a selection of the result; and displaying a card, dashboard, dashboard element, graph, infographic, or grid in response to the selection, the card including the at least the portion of the data associated with the result.

17. The one or more non-transitory computer-readable media of claim 16, the operations further comprising displaying the at least the portion of the data associated with the result in a table view, the table view configured to sort the result and receive a modification to the data associated with the result.

18. The one or more non-transitory computer-readable media of claim 16, wherein the card includes a sharing control that, when selected, displays a first field to designate a recipient and a second field to designate access privileges for the recipient.

19. The one or more non-transitory computer-readable media of claim 16, further comprising displaying suggested entities for further review based at least in part on the input.

20. The one or more non-transitory computer-readable media of claim 16, wherein the GUI is scaled to show at least the result in an initial view, the operations further comprising:

displaying a navigation control to change a scale of the GUI;

receiving a selection of the navigation control; and displaying the GUI at a changed scale in a subsequent view responsive to receiving the selection.

* * * * *